United States Patent
Khatam et al.

(10) Patent No.: US 10,045,160 B2
(45) Date of Patent: Aug. 7, 2018

(54) DYNAMIC FLOW AND DISTRIBUTION OPTIMIZATION

(71) Applicant: SPACEHEDGE, INC., San Diego, CA (US)

(72) Inventors: Bahman Khatam, Escondido, CA (US); Matthew Hosein Tasooji, San Marcos, CA (US); Say-Cheang Lim, San Diego, CA (US); Bharat Shah, San Diego, CA (US); Michael Tasooji, San Clemente, CA (US); Darren Lott, Anaheim Hills, CA (US)

(73) Assignee: SPACEHEDGE, INC., San Diego, CA (US)

( * ) Notice: Subject to any disclaimer, the term of this patent is extended or adjusted under 35 U.S.C. 154(b) by 0 days.

(21) Appl. No.: 15/165,748

(22) Filed: May 26, 2016

(65) Prior Publication Data

US 2016/0353249 A1    Dec. 1, 2016

Related U.S. Application Data

(60) Provisional application No. 62/267,125, filed on Dec. 14, 2015, provisional application No. 62/168,653, filed on May 29, 2015.

(51) Int. Cl.
*H04W 24/00* (2009.01)
*H04W 4/04* (2009.01)
(Continued)

(52) U.S. Cl.
CPC .............. *H04W 4/04* (2013.01); *G06Q 10/02* (2013.01); *G06Q 10/06* (2013.01); *H04B 1/385* (2013.01);
(Continued)

(58) Field of Classification Search
CPC ....... H04W 4/04; H04W 4/023; H04W 4/027; H04W 4/02; H04W 64/00; H04W 48/04; G06Q 10/02; G06Q 10/06; H04B 1/385; H04Q 3/64; G01S 19/14; G01S 5/02; G01S 5/0252; G01S 5/14; H04L 29/08657;
(Continued)

(56) References Cited

U.S. PATENT DOCUMENTS

2004/0203391 A1* 10/2004 Hoshina ............... G01S 1/68
  455/41.2
2008/0231507 A1* 9/2008 Burckart ............. G01C 21/20
  342/357.52

(Continued)

*Primary Examiner* — Kathy Wang-Hurst
*Assistant Examiner* — B. M. M Hannan
(74) *Attorney, Agent, or Firm* — Mintz Levin Cohn Ferris Glovsky and Popeo, P.C.

(57) ABSTRACT

Methods and apparatus, including computer program products, are provided for monitoring group location. In some example embodiments, there is provided a method which includes receiving, at a controller, a location of a group of trackers; determining, by the controller, whether to optimize a schedule for the group of trackers as the group of trackers traverses a venue, wherein the determining is based on at least the received location; and sending, by the controller, a message to update the schedule, when the determining indicates the optimization should be performed. Related systems, methods, and articles of manufacture are also described.

18 Claims, 17 Drawing Sheets

(51) Int. Cl.
*H04W 4/02* (2018.01)
*H04Q 3/64* (2006.01)
*H04B 1/3827* (2015.01)
*G06Q 10/02* (2012.01)
*G06Q 10/06* (2012.01)

(52) U.S. Cl.
CPC .............. *H04Q 3/64* (2013.01); *H04W 4/023* (2013.01); *H04W 4/027* (2013.01)

(58) Field of Classification Search
CPC ........ H04L 29/08108; H04L 29/08936; H04M 1/72572; H04M 1/72577; G01C 21/20
USPC ............................................... 455/456.1–457
See application file for complete search history.

(56) References Cited

U.S. PATENT DOCUMENTS

| | | | |
|---|---|---|---|
| 2010/0080163 A1* | 4/2010 | Krishnamoorthi | H04L 12/189 370/312 |
| 2012/0116863 A1* | 5/2012 | Boss | G06Q 30/0235 705/14.35 |
| 2013/0151296 A1* | 6/2013 | Waytena | G06Q 10/02 705/5 |
| 2013/0332509 A1* | 12/2013 | Schwartz | G07C 11/00 709/203 |
| 2014/0163934 A1* | 6/2014 | Zhang | G06Q 10/06 703/2 |

* cited by examiner

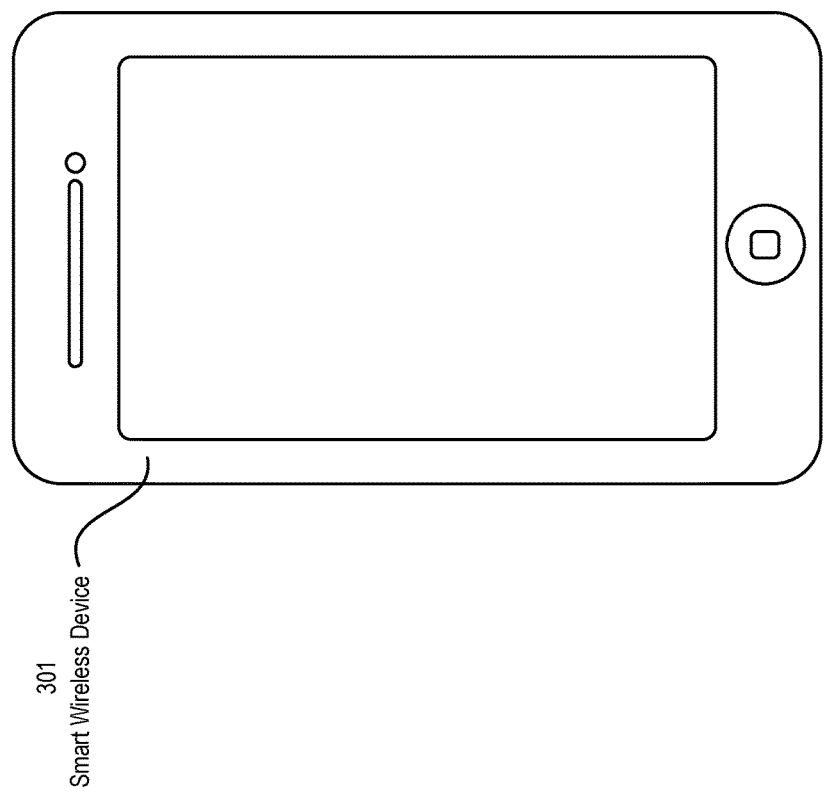

DYNAMIC FLOW AND DISTRIBUTION OPTIMIZATION

CROSS-REFERENCE TO RELATED APPLICATION

This application claims the benefit under 35 U.S.C. § 119(e) of the following two provisional applications, which are incorporated herein by reference in their entirety: U.S. Ser. No. 62/168,653, entitled "METHOD OF DYNAMIC FLOW AND DISTRIBUTION OPTIMIZATION FOR MICRO-MACRO AND MACRO-MACRO NETWORKS BASED ON A HIERARCHAL FEEDBACK SYSTEM," filed May 29, 2015 and U.S. Ser. No. 62/267,125, entitled "DYNAMIC FLOW AND DISTRIBUTION OPTIMIZATION," filed Dec. 14, 2015.

FIELD

The present disclosure generally relates to optimizing flow in a wireless network of tracker and controllers.

BACKGROUND

Groups visiting physical venues that may include multiple physical spaces and points of interest such as an amusement venue frequently encounter a seemingly insurmountable challenge of waiting in queues for a specific attraction or point of interest—significantly reducing and detracting from the actual time spent experiencing the attraction itself. This task is made even more difficult by the very dynamic nature the amusement venue. At any instant of time for example, a given point of interest may be congested and have a certain wait time, but that very same ride may have less wait at another time. Yet at the same time, another point of interest within the same venue may have no or minimal wait time. These and other factors can also affect the amount of time a user waits for a given point of interest, which may result in inefficient capacity management for the park operator and a poor user experience for the park visitors.

SUMMARY

Methods and apparatus, including computer program products, are provided for monitoring group location.

In some example embodiments, there is provided a method which includes receiving, at a controller, a location of a group of trackers; determining, by the controller, whether to optimize a schedule for the group of trackers as the group of trackers traverses a venue, wherein the determining is based on at least the received location; and sending, by the controller, a message to update the schedule, when the determining indicates the optimization should be performed.

In some implementations, the above-noted aspects may further include additional features described herein including one or more of the following. The method may further include receiving, via a location message transmitted to the controller via a wireless link, a current location of the group. The received information may include one or more of a distance to a subsequent attraction, a likelihood that the group may miss the subsequent attraction, an average speed for the group, and/or an indication that the attraction has been missed by the group. The received information may include a quality of service level for the group. The received information may include a preference regarding one or more attractions the group prefers to visit at the venue. The received information may include a current state of the venue. The received information may include one or more constraints regarding the venue. The received information may include a distance to a subsequent attraction, a likelihood that the group may miss the subsequent attraction, an average speed for the group, and/or an indication that an attraction has been missed by the group. The monitoring may include continuously monitoring the location of the group as the group traverses the venue. The determining may include generating at least one virtual queue for at least one attraction at the venue. The determining may include optimizing for a plurality of groups, wherein each of the groups has a corresponding preferred virtual person holding a position in the at least one virtual queue. The optimizing may be performed for each group based on the received information. The at least one virtual queue may correspond to at least one real queue at the venue. The at least one virtual queue may include at least one preferred virtual person providing, for the at least one group, a position in the at least one virtual queue, and further includes at least one commodity virtual person, wherein the at least one preferred virtual person has a higher quality of service, when compared to the at least one commodity virtual person. The controller may monitor one or more conditions in the venue being traversed by the group. The controller may include a super controller coupled wirelessly to the group of trackers and at least one master controller. The trackers may each include a smart watch and/or a wearable wireless device. The venue may include an amusement park including a plurality of attractions, a cruise ship, a museum, a shopping mall, a school, a casino, a resort, a campus, and/or a retirement care facility. The location may be determined by GPS circuitry at the trackers.

It is to be understood that both the foregoing general description and the following detailed description are exemplary and explanatory only and are not restrictive. Further features and/or variations may be provided in addition to those set forth herein. For example, the implementations described herein may be directed to various combinations and sub-combinations of the disclosed features and/or combinations and sub-combinations of several further features disclosed below in the detailed description.

BRIEF DESCRIPTION OF THE DRAWINGS

The accompanying drawings, which are incorporated herein and constitute a part of this specification, show certain aspects of the subject matter disclosed herein and, together with the description, help explain some of the principles associated with the subject matter disclosed herein. In the drawings.

FIG. 3 depicts an example of a smart phone implementation of a master controller, in accordance with some example embodiments;

Figure 1:
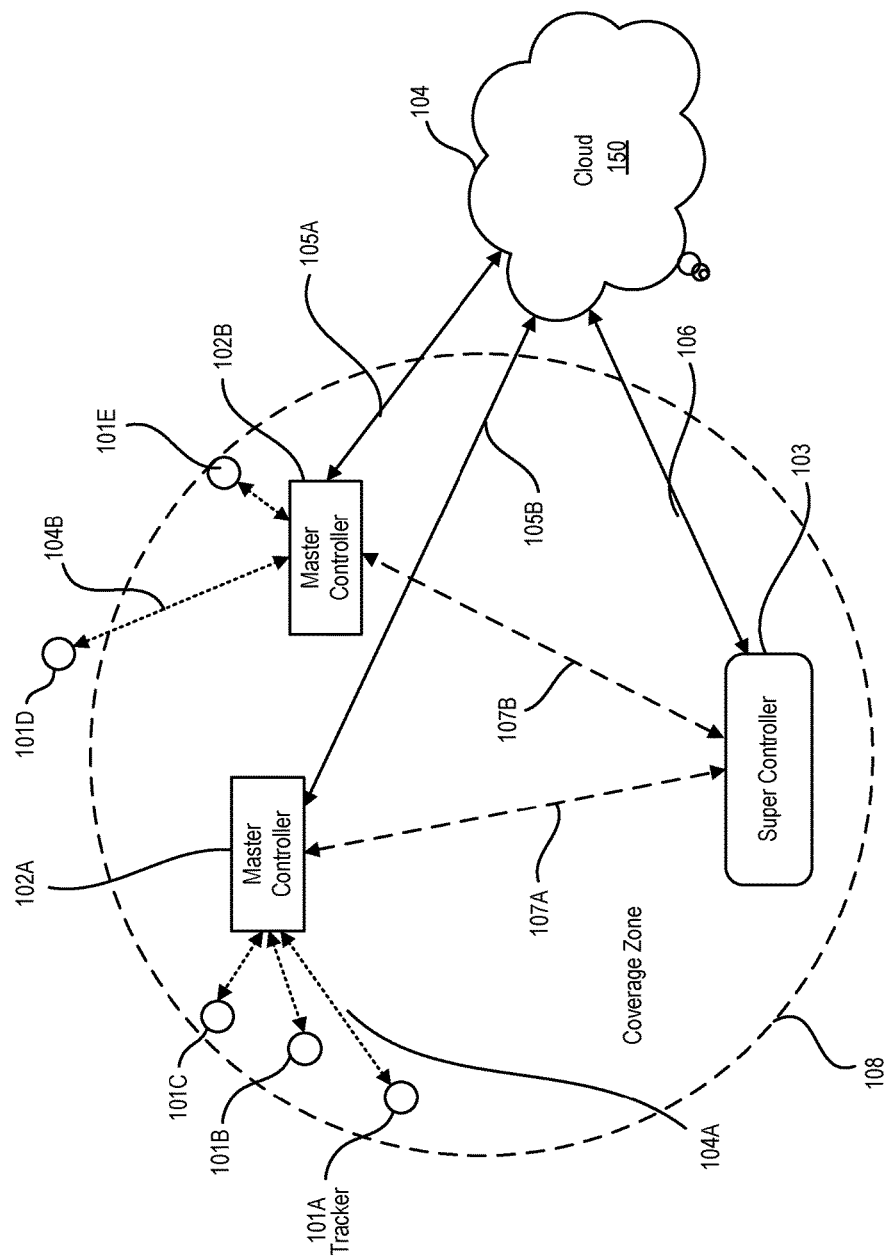
FIG. 1 depicts an example of a system for controlling flow, in accordance with some example embodiments.

Like labels are used to refer to same or similar items in the drawings.

DETAILED DESCRIPTION

From the perspective of a venue operator such as an amusement park operator and/or the like, the venue operator may want to control the flow through the venue, such as an amusement park and/or the like. For example, the venue operator may want to alleviate congestion by encouraging users to move to another ride that at a certain time is underutilized. Likewise, an operator may want to control usage of the ride if the monitored location of the users indicates that the users may not be able to walk to the next ride in time to make a scheduled start time for that ride.

In some example embodiments, the locations of one or more groups of user equipment carried by users may be monitored as the users traverse a venue, such as an amusement park. Moreover, the flows associated with these groups may be controlled in order to optimize a certain set of criteria, such as minimization of wait times, encouraging use of certain rides, maximizing the number of users in the venue, and the like. The optimized flow may thus provide a scheduled time for a group of users to be at an attraction and ready to for example ride a ride or attend some other type of attraction. The flow may be optimized on a group level and across some if not all groups, in accordance with some example embodiments. In addition, the flow optimization may be performed dynamically in the sense that as conditions change at the venue, the flow optimization may be updated.

Although some of the examples described herein refer to flow optimization in an amusement park, the flow optimization disclosed herein may be used to control the flow in any other type of venue or area including a cruise ship, a museum, a shopping mall, a school, a casino, a resort, a campus, a retirement care facility, and/or in any other venue or location. Moreover, although some of the examples refer to amusement park rides (or "rides"), the flow optimization may be performed for any other type of attraction including shows, restaurant reservations, distributed computer or processing networks, and/or the like.

FIG. 1 depicts an example system 100, in accordance with some example embodiments.

The system 100 may include a plurality of user equipment 102A-B, 101A-E, and 103 within a wireless coverage area 108. This coverage area may represent some, if not all, of the geographic area associated with a venue, such as an amusement park.

In the example of FIG. 1, user equipment 101A-E may correspond to devices being tracked within a certain coverage area or zone 108 in the amusement park. As such, the user equipment 101A-E are also referred to herein as "trackers." Each of user equipment 102A-B represents a master controller, and user equipment 103 represents a super controller.

In the example of FIG. 1, master controller 102A and trackers 101A-C represent a first group, while master controller 102B and trackers 101D-E represent a second group. For example, the first group may represent a family attending the amusement park as a group, while the second group may represent a group of friends attending the park. One or more groups may be aggregated to form a "network," within a predefined or dynamic geographical region, such as coverage area 108. The network may represent for example a defined collection of groups in a fixed or dynamic interconnected system, such as a distributed communication or computing system. Although this example refers to a group having a single master controller and a plurality of trackers, the group may use other quantities of master controllers and trackers as well. For example, a group may have a plurality of master controllers as well. Moreover, a group may be formed with a single master controller and/or a single tracker. Although the previous examples refer to two groups, other quantities of groups may be implemented as well.

In some example embodiments, a group of trackers such as trackers 101A-C may be associated with a master controller 102A. When this is the case, the group of trackers may provide location information as well as other information to their master controller 102A (and/or directly to the super controller 103 as well). Master controller 102A may then provide the group's information to a super controller 103, which performs the flow optimization. As such, super controller 103 may send to master controller 102A and/or trackers 101A-C an optimized flow in the form of for example one or more point(s) of interest in the venue, such as a list of one or more rides at the amusement park, and an expected or scheduled time for the group to be at the point(s) of interest with little if any wait.

Moreover, as the state of the venue changes due to for example temporarily broken rides and/or unexpected congestion at certain rides, the super controller may send an update message including a revised flow including for example a point of interest and a scheduled time. For example, if a ride has been temporarily or unexpectedly closed at a certain point in time, the super controller may send an update message including a revised (or re-optimized) flow including a revised list of rides and/or a revised schedule indicating when to be at the ride(s). In addition, the state of the group may also be taken into account. For example, if the group's monitored location indicates that the group will not make a scheduled ride for whatever reason, the super controller may send an update message including a revised (for example, re-optimized) flow including a revised ride and/or a revised schedule to take into account the group's state (which in this example is the group's location).

Although the previous example describes flow optimization being performed by the super controller, the master controller may also perform flow optimization. For example, the super controller may provide criteria and other information to the master controller to enable the master to optimize the flow for the group. In this example, the master controller may report the optimized flow to the super controller.

In some example embodiments, the flow optimization is performed based on a virtual person. In a given network covering a venue for example, each point of attraction may include a virtual queue. For example, a ride may have a capacity of 500 riders per hour. For this ride, the super controller may establish a virtual queue including one or more virtual persons (or people). The virtual people represent the people/person(s) scheduled in the virtual queue for that ride. In some example embodiments, the super controller monitors the state of the actual, physical (or real) ride and the state of the group including the group's location, and as the state changes, the super controller may re-optimize by updating the virtual queue to represent the current state of the actual, real queue at the ride (e.g., wait times, current groups/people in queue, and/or the like) and the corresponding position of the virtual person(s) in the virtual queue, which may trigger a rescheduling of the virtual person(s) for a given group or groups. If the position of the virtual person(s) for a given group in the queue is rescheduled, the super controller may send an update message to the group indicating a revised time for the group at the actual, physical ride. Moreover, if the change affects other points of interest, the super controller may re-optimize the virtual queues for those points of interest as well and send corresponding update messages if needed.

In some example embodiments, the tracker may be configured to determine its location, provide the obtained location information to other devices such as a master controller (and/or super controller), provide tracker status information to the other devices, display a flow (for example, a schedule of the rides including a geographic route/path), provide a mobile payment system to allow access to the ride or make purchases (for example, food, souvenirs, and the like), and/or the like. The location information may comprise a latitude and longitude of the tracker and/or a time stamp, although other forms of location information may be used as well (for example, ride location, street address, and/or the like). The tracker status information may include whether the tracker is on or off, amount of battery remaining at the tracker, a current capability of the tracker, and/or any other information that may be used by the system.

In some example embodiments, the tracker may provide information to a master controller directly via a direct wireless link, or may provide information indirectly via another device or another network (for example, via network 150, such as the Internet, a cellular network, a Wi-Fi network, and/or the like). For example, tracker 101A may transmit location information via link 104A to master controller 102A. The point-to-point link 104A may comprise a Wi-Fi direct, Bluetooth, Bluetooth low energy, and/or any other type of radio technology. Alternatively or additionally, tracker 101A may send a message to master controller 102A indirectly via a cellular network, Wi-Fi network, the Internet, and/or the like. The trackers may provide location information to the master or super controller from time to time, continuously, and/or upon request.

Figure 2A:
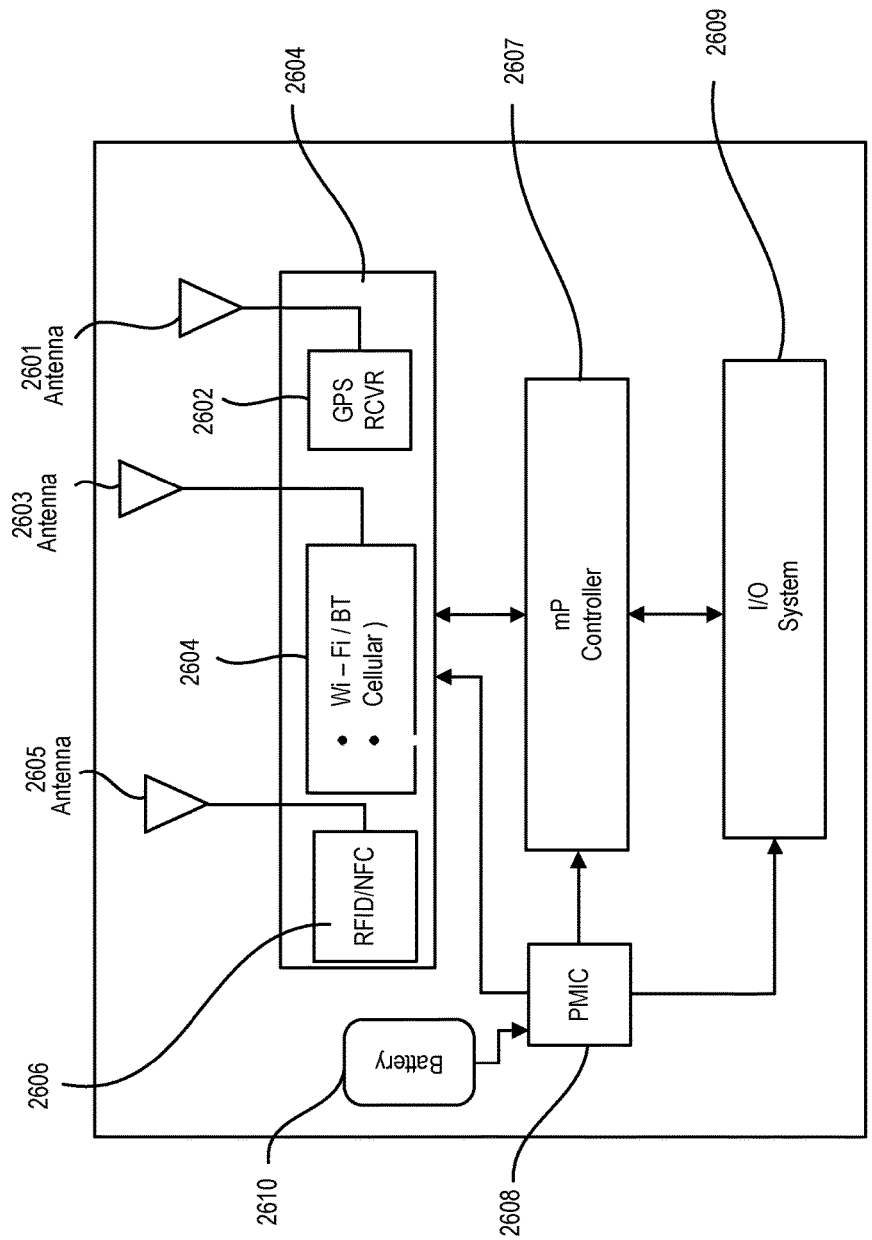
FIG. 2A depicts an example of tracker circuitry, in accordance with some example embodiments.

FIG. 2A depicts an example of a block diagram of a tracker, in accordance with some example embodiments.

The tracker may include a radio front end including a Global Navigation Satellite System (GNSS) receiver, such as a Global Positioning System (GPS) receiver 2602, coupled to an antenna 2601, a radio transceiver 2604 coupled to an antenna 2603, and an NFC/RFID transceiver 2606 coupled to antenna 2605. The GPS receiver may receive for example a GPS signal and thus provide the location of the tracker. The radio transceiver 2604 may provide communication links to other devices, and may be configured in accordance with a radio technology such as cellular, Wi-Fi, Bluetooth, Bluetooth Low Energy, and/or any other radio technology. The NFC/RFID may be used to provide proximity information that may detect if a tracker is proximate to another device, such as another tracker, a master controller, an NFC sensor at a ride, a beacon (for example, a Wi-Fi or Bluetooth Beacon), and/or the like.

Moreover, the NFC/RFID transceiver 2606 206 may be used for mobile payments with a NFC sensor coupled to a point of sale device.

The tracker may also include at least one processor, such as a microprocessor controller 2607, and at least one memory. The tracker may also include an I/O system 2609, such as a display and/or the like. The tracker may also include a power management integrated circuit (PMIC) 2608 for managing power supplied by for example battery 2610. To illustrate, processor 2607 (labeled microprocessor (mp) controller) may execute program code configured to provide the tracker operations disclosed here. The processor 2607 may for example be configured to process the obtained location information (which indicates the location of the tracker) as well as other information such as the tracker status information.

The GPS receiver circuitry 2602 may be used to receive and obtain the location of the tracker (or a proximity to other trackers, the master controller, and/or other devices). Although the tracker includes a GPS receiver, location information may also be obtained via alternative technologies, such as RFID proximity tagging, Bluetooth beacon technology, Wi-Fi triangulation, wide area network (or cellular) location assisted technology, or any combination of these technologies. For example, the tracker may determine its location from Wi-Fi based location based services (which use Wi-Fi transmit signals to determine location), beacons (which use for example Bluetooth and Bluetooth Low Energy transmitters placed in a known locations that transmit a certain signal such as an identifier or location), near field communications (NFC), and/or the like.

Figure 2B:
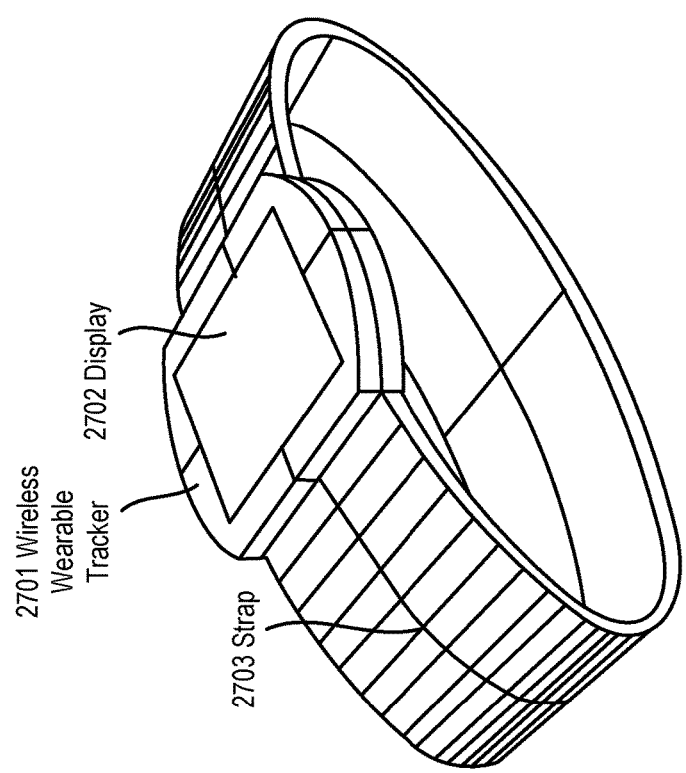
FIG. 2B depicts an example of a smart watch implementation of a tracker, in accordance with some example embodiments.

FIG. 2B depicts an example implementation of a tracker, in accordance with some example embodiments. In the example of FIG. 2B, the tracker comprises a wearable device such as a smart watch 2701 comprising a watchband 2703 and a display 2702. Tracker 2701 may include some if not all of the circuitry of FIG. 2A. Although the tracker is described as a wireless smart watch, other types of user equipment, such as a smart phone, a tablet, a cell phone, and/or any other wireless device or wearable wireless device may be used as well.

Referring again to FIG. 1, each master controller may aggregate location information and other data obtained from the trackers that are part of the master controller's group. The master controller may then forward, on behalf of the group, the aggregated information including location information to the super controller. Each of the master controllers 102A-B may thus aggregate information including location information for their respective groups, and forward the location information and the like on a group basis to super controller 103. In this way, the master controller and/or super controller may monitor the location of the tracker(s) as well as the master tracker (which may also include GNSS circuitry).

The master controller may be implemented in a similar manner as described above with respect to FIG. 2A. FIG. 3 depicts an example implementation of the master controller, in accordance with some example embodiments. In the example of FIG. 3, the master controller may be implemented as a smart phone 301 including some, if not all, of the tracker circuitry of FIG. 2A. Although FIG. 3 depicts a smart phone 301, other types of wireless user equipment including a processor-based device, wearable wireless device, a computer, a tablet, a tracker, and/or the like may be used as well.

In some example embodiments, the master controller may be part of the group having its location monitored. For example, the master controller may represent a parent monitoring a family group as the group traverses the park. Alternatively, the master controller may not be part of the group, but rather the master controller may just monitor the group(s) as they traverse a certain area. For example, the master controller may monitor one or more group(s) in a portion of the park, and report the location of the groups to a super controller. In a park including for example a kiddie land fun zone having rides and a killer coaster zone having rides, a master controller may be fixedly placed in the kiddie land fun zone to monitor the one or more groups as they traverse the kiddie land fun zone, while another master controller may be fixedly placed in the killer coaster zone to monitor the one or more groups as they traverse the killer coaster zone. In this example, both masters may send monitored location information to the super controller, receive update messages regarding flow from the super controller, send messages to trackers, and/or perform other operations disclosed herein.

Referring again to FIG. 1, members of a group may be placed into two or more subgroups within a group. Each subgroup may have its own unique ride preferences. Members within subgroups may be allowed, by the super controller or master controller, to move from one subgroup to another subgroup during a given visit to the venue. The park operator via the super controller my elect to apply rules to govern movement among subgroups, such as limiting the moves to once per a given time period (for example, one per day).

The super controller 103 may comprise at least one processor, at least one memory, and a wired and/or wireless interface. The super controller 103 may receive information including location information from one or more master controllers, perform optimization of a flow on a group basis for a venue covered by coverage area 108, and/or provide to each of the master controllers an optimized flow for each group (for example, a list of one or more rides, a schedule for the one or more rides, and/or a suggested route through the amusement park).

The super controller 103 may provide the optimized flow information to each of the master controllers separately (for example, via a message to each master controller) and/or via a single broadcast message that each master controller can receive and read. Alternatively or additionally, the super controller 103 may provide the optimized flow information to each of the master controllers via dedicated one or more messages addressed to each the master controllers, which can then communication with the trackers. Alternatively or additionally, the super controller 103 may provide the optimized flow information to the trackers as well (for example, as a broadcast or via messages to each of the trackers). The super controller may send the optimized flow information (for example, a list of one or more rides, and/or a schedule) on predetermined or scheduled basis, when requested by a master controller, or when needed by the super controller to dynamically control the flow.

In some example embodiments, the super controller 103 may initially provide, to each master controller, optimized flow information (for example, a list of one or more rides and/or a schedule). As conditions such as congestion, ride breakdowns, the location of the group, and/or the like change, the super controller may dynamically alter this initial optimized flow information by providing update messages including additional information to the master controllers and/or trackers to satisfy a certain optimization criteria (which may be defined at the super controller). Moreover, the update messages may also include status information on a given ride, such as a wait time. Alternatively or additionally, the update messages may also indicate that a tracker is associating with another group of trackers. Alternatively or additionally, the update messages may indicate that a tracker has left the coverage area or a given space established by the master controller. Alternatively or additionally, the update messages may indicate an alternative attraction or a promotion, such as a coupon.

In some example embodiments, super controller 103 may be used by the operator of the park or venue to enhance the guest experience while visiting the venue. For example, the operator may configure optimization criteria, such waiting times in the queues for the rides, reducing congestion in certain areas of the amusement park or venue, minimize travel time between rides, and/or the like. In this example, individual riders in a group may each carry a tracker, and a group leader may be selected as a master controller. The master controller may provide a list of preferred rides and/or schedule. The super controller may, in response, provide an optimized flow comprising a list of one or more times and a schedule for those rides. For example, the super controller may monitor the location of the groups, receive location information for the groups, receive preferences regarding user preferences for certain points of interest such as rides, and/or monitor park operations (for example, current queue lengths, outages, and the like).

When the super controller determines that a queue for a particular point of interest such as a ride is too short or too long for example (or the group's location indicates that the group will not be able to make its next scheduled ride in time), the super controller may, based on optimization criteria set by the venue operator, detect an opportunity to manage a group's flow. When that is the case, the super controller may send messages directly to the trackers or through the master controllers providing an updated flow offering a ride or attraction with a shorter line to optimize the criteria (which in this example is shorter wait times and reducing congestion in certain areas of the venue). Likewise, when the super controller determines that a group is too far from their next scheduled ride (and as such will likely miss their scheduled time), the super controller may, based on optimization criteria set by the venue operator, detect an opportunity to manage a group's flow and, as such, send an update message with a revised flow to the group (and perhaps, reallocate the missed time to another group).

Figure 4:
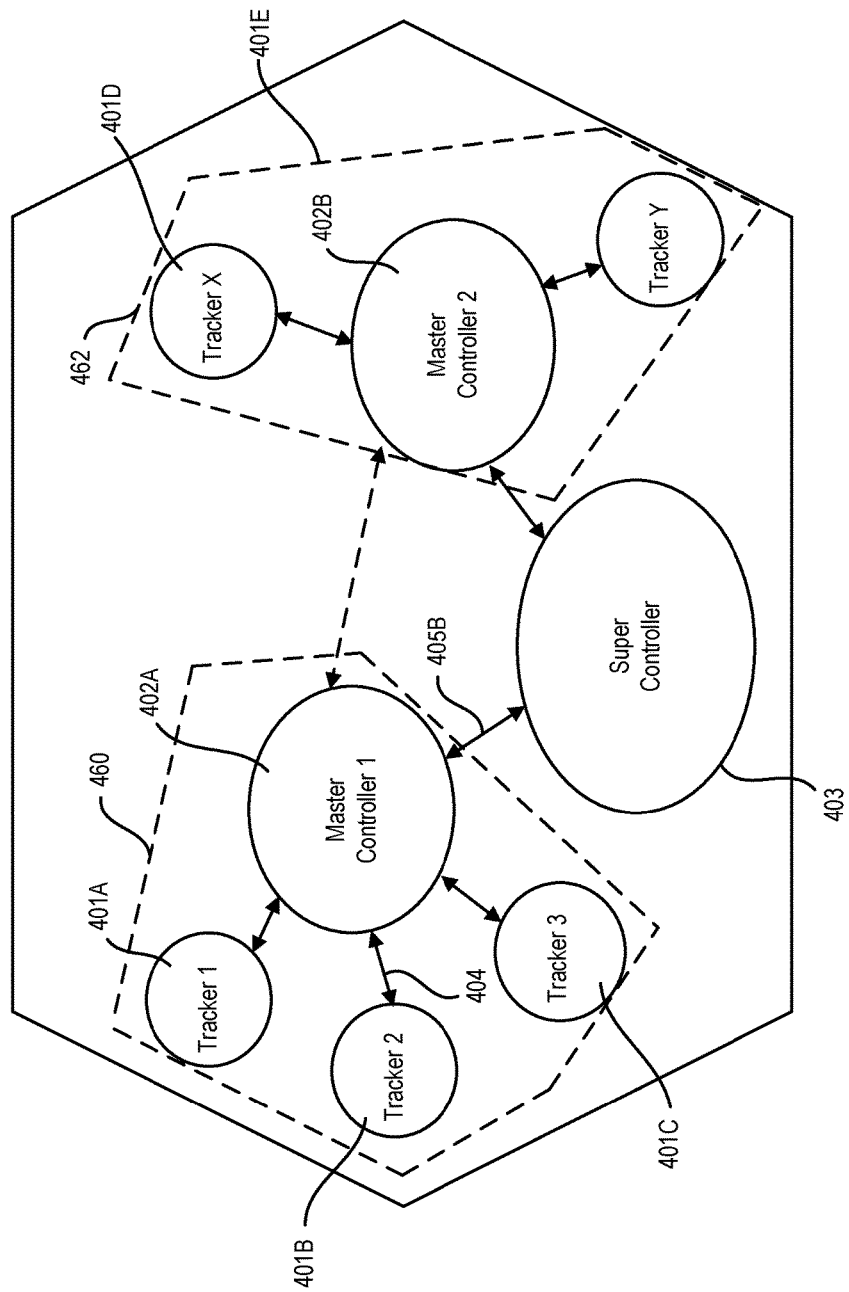
FIG. 4 depicts the system of FIG. 1 including geo-coverage zones, in accordance with some example embodiments.

FIG. 4 depicts the system of FIG. 1 but further depicts spaces 460 and 462. In the example of FIG. 4, master controller 402A may define space 460. The space 460 may require the trackers 401A-C located within space 460 to remain within the proximity of master controller 402A. The space 462 may require the trackers 401D-F located within space 462 to remain within the proximity of master controller 402B. Referring again to space 460, space 460 may be defined as a distance between a tracker and the master controller and/or any of the other trackers within the group. For example, the space 460 may specify that the trackers must remain within 50 feet of each other, and if that distance is exceeded, an alarm message may be sent to the master controller. Alternatively or additionally, the space may specify a certain distance around a ride or a certain zone (or area) of the venue. For example, master controller 402A and trackers 401A-C may be at a certain ride, and the space 460 may specify a zone or area covering that ride. If a tracker goes outside the space, an alarm message may be sent to the master controller. The location may be used to determine whether a tracker crosses a space to trigger an alarm. Alternatively or additionally, the space may be defined by drawing a polygon or fence on a user interface. Alternatively or additionally, the super controller may define the spaces 460 and 462. For example, the super controller may define space 460 as kiddie fun zone and space 462 as killer coaster zone.

In some example embodiments, one or more super controllers 103 may be controlled by another, higher layer controller as well. When this is the case, the system may thus have multiple layers of tracking constituting a multi-level hierarchical network structure.

Figure 5:
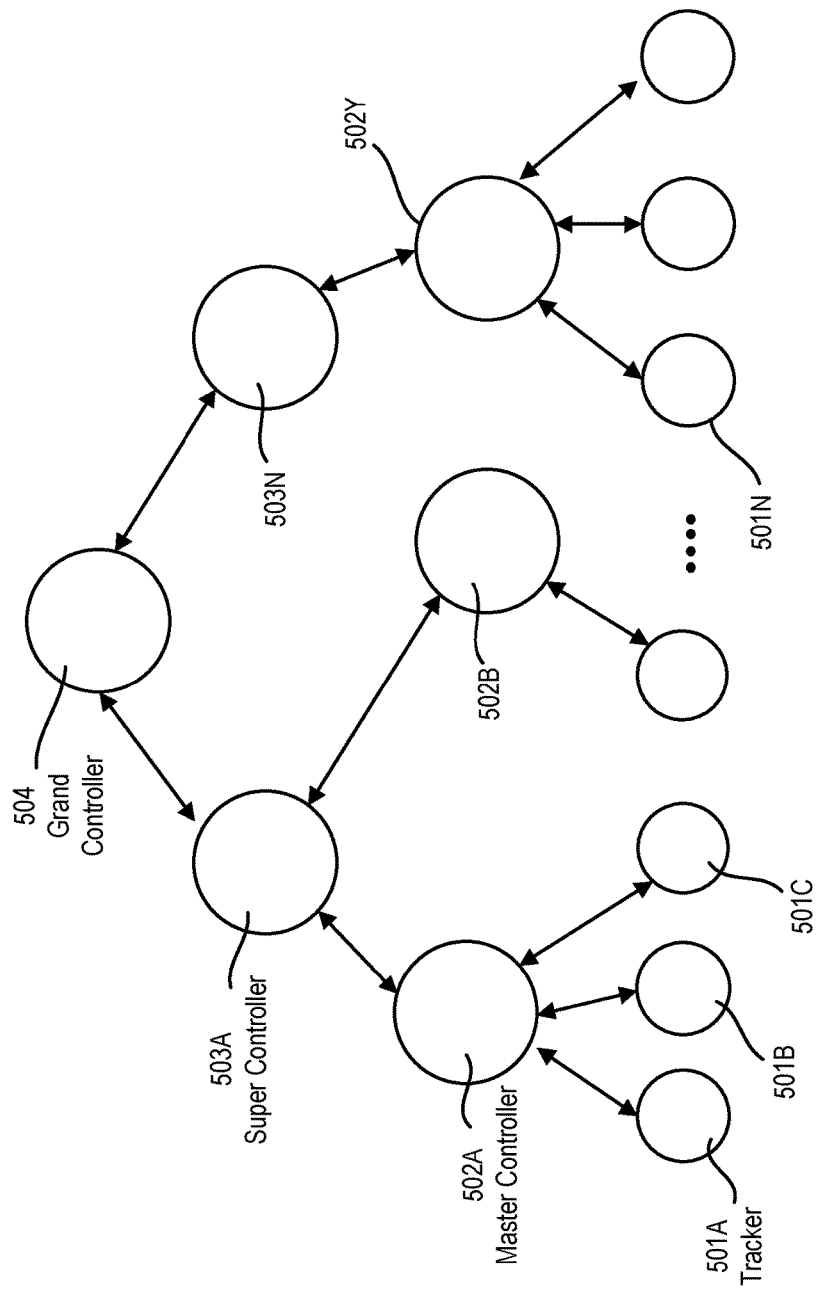
FIG. 5 depicts an example of a hierarchal structure, in accordance with some example embodiments.

FIG. 5 depicts the hierarchical control of the groups, in accordance with some example embodiments. In the example of FIG. 5, trackers 501A-N provides information including location information to a corresponding master controller, such as master controllers 502A-Y. Master controllers provide information including location information to a corresponding super controller, such as super controllers 503A-N, and super controllers provide to a corresponding grand controller 504 information including location information, excess capacity information (in the distributed computing network, for example), and/or other information. To provide information towards the trackers, the grand controller may send information to a corresponding master controller. The master controllers provide information including location information to the corresponding trackers.

In order to further optimize flow (for example, overall ride utilization for a venue and overall wait times for the visitors of the venue), the super controller may use the information received from the master controllers to provide a response to the master controllers. The response may be in the form of a message including a new or updated schedule of ride times for a group. The super controller may receive the information from the master controllers substantially the same time. Moreover, this received information may be received continuously or substantially continuously in real-time. When a master controller receives a response message from the super controller, the master controller may send a message to the trackers. This information may include the new or updated schedule, for example. In another example, the super controller (or the grand controller of FIG. 5) may send this information directly to trackers.

Figure 6A:
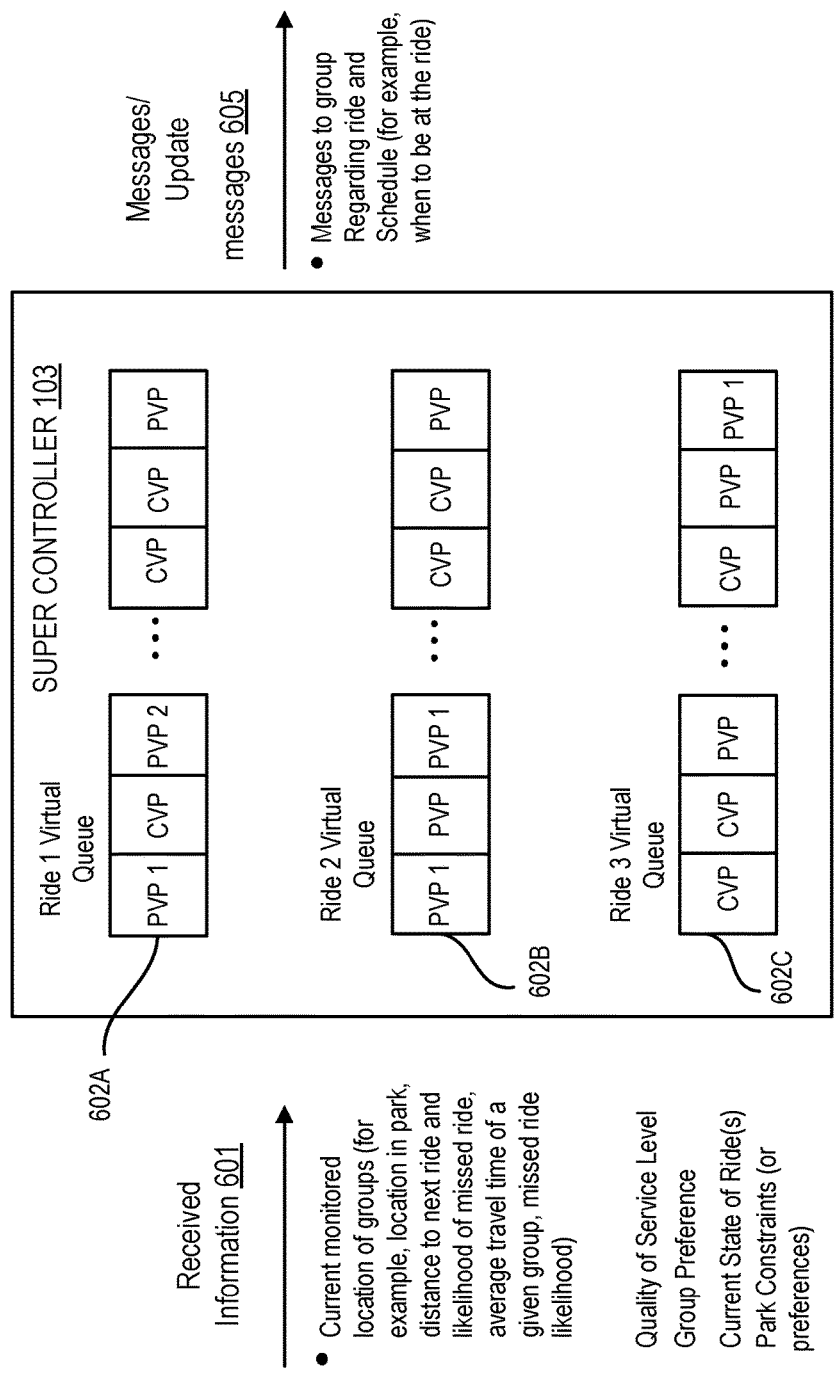
FIG. 6A depicts an example of a super controller for flow optimization, in accordance with some example embodiments.

FIG. 6A depicts an example block diagram depicting super controller 103 configured to optimize the flow of groups, in accordance with some example embodiments. The description of FIG. 6A also refers to FIG. 1. Although the following description refers to operations performed by super controller 103, other processor-based devices including a master controller may perform some, if not all, of the operations described with respect to the super controller.

In some example embodiments, the super controller 103 may monitor the location of one or more groups carrying the trackers and/or master controller(s) as the groups traverse an amusement park. In some example embodiments, the super controller 103 may also receive, or determine, the distance (or time) from a group's current monitored location to the group's next schedule ride to monitor the location of one or more groups. The super controller may obtain from time to time location information from the trackers (and/or the master controller). The super controller may also monitor the location of the one or more groups directly (for example, by directly monitoring the trackers/master controller location as those devices send location update messages to the super controller) and/or indirectly via the corresponding masters for the groups (which may provide the group's location information to the super controller from time to time).

The super controller 103 may also receive, or determine, missed ride information for a group (for example, an actual missed ride by a group, a request message from a group to miss or reschedule a ride, or a likely missed upcoming ride due to the group being too far from its next ride to make the scheduled ride). For example, a ride may include a device, such as a master controller or other type of processor-based monitoring device, to track the groups in the actual queue, track the groups as they enter the ride, track the current state of the ride with respect to expected wait times, and/or the like.

The super controller 103 may also assign a quality of service to one or more groups. In some example embodiments, visitors to the park may be in a group, and this group may purchase a higher quality of service ticket. For example, the group carrying the trackers and/or master controller may purchase a platinum ticket having certain ride priority privileges. While other visitors may purchase a regular ticket without these privileges. Although the previous example mentions 2 service levels, other quality of service levels may also be provided as well.

The super controller 103 may also receive information regarding group preferences. In some example embodiments, the super controller may query the master controller for the identity of the group members and preferences with respect to rides and/or schedules for those rides (for example, a ranking of preferred rides). In response, the master controller may provide the pertinent tracker information and preferences to the super controller.

The super controller 103 may also receive information regarding the state of the park. Some of the information may be static in nature. For example, the super controller may include (or receive, have access to, and/or the like) static state information regarding zones or subzones in a park, such as kiddie land, killer coast zone, food courts, and the like, and geographic boundaries associated with these zones. Moreover, the static information may include rides in each zone, distances between rides, average ride times, capacity of rides, operating hours for the park and rides, and/or the like. Some of the information may be more dynamic in nature. For example, the super controller may receive dynamic information regarding the state of the park. This information may include a current wait time for a ride, a maintenance outage at a ride, an unexpected or early closing of a ride, and/or the like.

The super controller 103 may also receive information regarding other constraints regarding the park, which may be taken into account during the optimization. Examples of constraints include an attraction being down for maintenance, a parade schedule, a change in weather conditions, an area where children are not allowed, and/or the like.

For each of the rides in the park, the super controller 103 may generate a virtual queue, such as virtual queues 602A-C. Each of the virtual queues may correspond to an actual (for example, real) queue for a given ride. For example, the super controller may generate a virtual queue to correspond to a real queue for a given ride. The super controller may then place one or more virtual people, such as virtual people in the virtual queue. The virtual people may thus represent a position in the real queue for the given ride. The super controller may thus use the virtual queue to schedule groups of riders in the real queue for the real/actual ride. For example, the super controller may use the virtual queue(s) to provide an initial schedule to a group when they first arrive to a park, and the super controller may wirelessly send update messages with a revised list of one or more rides and/or schedule times for those rides.

In some example embodiments, some of the virtual people may correspond to a group of visitors that purchase a higher quality of service tickets, in which case these virtual people (or person(s)) will be referred to herein as Privileged Virtual Person (PVP). Some of the virtual people may correspond to the regular visitors without higher quality of service tickets, in which case these virtual people will be referred to herein as Common Virtual Person (CVP). In the example of FIG. 6A, the virtual queue for ride 1 includes a PVP followed by a CVP, and so forth. This virtual queue 602A may thus represent a real queue of a real ride, namely ride 1. In this example, the CVP thus serves as a placeholder in the virtual queue, and this placeholder represents the actual position of the person(s) in the real/actual queue for a real ride. In the case of a PVP, each PVP may represent at least one rider carrying a tracker and/or a master controller. For example, PVP 2 at virtual queue 602A may correspond to at least one of the riders in a privileged group, and this group may not actually be in the real queue. Instead, the super controller 103 may schedule the group corresponding to the PVP 2. The size of the PVP may be equal to the size of the group. For example, a group having 4 people may either have a single PVP that would occupy 4 positions in line or 4 PVPs each occupying 4 positons in line. To schedule PVP 2, the super controller 103 may wirelessly send a message to the group (for example, via the master controller and/or directly to the trackers of the group). In addition, this message may indicate the group's ride time on real ride 1. In this way, the super controller 103 may dynamically control the flow of usage of rides on a group basis to provide a so-called "just-in-time" ride experience to the PVP groups. For example, when PVP is in the front (or approaching the front) of the virtual queue 602A, the super controller 103 may send a message to the master controller associated with that PVP and group. The message may indicate for example please go to actual Ride 1 as it is your turn to ride Ride 1.

To illustrate further, the super controller 103 may assign, based on received information 601, one or more groups to positions in virtual queues, such as virtual queues 602A-C. For example, ticket holders purchasing a higher quality of service may be assigned one or more PVPs slots in the virtual queues for one or more rides. When this is the case, these PVP groups may not need to wait in the real queue for a ride, but instead appear at the ride at the scheduled time. The PVP assignments may be communicated to the group as a scheduled time to appear at a given ride, and sent as a message 605. In some example embodiments, the scheduling in the virtual queues may take into account the current location of the groups, the distance (or time) between rides, and/or other factors disclosed herein to schedule the PVPs in the virtual queues (which represents scheduling in a real queue for a real ride).

In the case of ticket holders corresponding to CVPs, these ticket holders may be required to wait in the real queue. In this way, the super controller 103 may meter the flow of the PVPs at a given ride. Moreover, as conditions change related to the state of the PVP groups or the state of the park, the super controller may send update messages 605 to revise the time or rides for the PVPs.

For the purposes of scheduling PVPs and determining a time when the PVPs will reach the front of a virtual queue, the super controller may insert a certain number of CVPs in the virtual queue in between the PVPs. To determine the quantity of CVPs that are inserted, the super controller may also consider a number of factors in determining the correct number of CVPs to insert. These factors may include group preferences, size of the groups, location in the venue, relative queue lengths, operator desire for actual wait times for visitors without PVPs, and/or other factors.

In some example embodiments, the quality of service level may, as noted, define at the super controller 103 a quantity of members in a group and a corresponding quantity of PVPs allowed for that group. For example, a group of 4 people carrying the trackers/master controller may have "platinum level" tickets, in which case the group may be allocated 5 PVPs per member of the group. As such, the super controller may schedule 5 sets of PVPs in the virtual queues. A group having lower tier, "gold level", tickets may, however, only be allowed 4 sets of PVPs in the virtual queues. The greater the quantity of PVPs assigned to a group, the greater the quantity of PVPs that can be used by a given group as placeholders in the virtual queues.

The super controller 103 may, as noted, assign the PVPs for the groups to the virtual queues. In some example embodiments, the super controller may optimize the scheduling among the virtual queues based on one or more factors. For example, the super controller may optimize based on the actual location at any given time of a group. Alternatively or additionally, the super controller may optimize based on the distance (or travel time) from a ride to another ride. Alternatively or additionally, the super controller may optimize based on the group's preferences with respect to rides and/or schedule. Alternatively or additionally, the super controller may optimize based on dynamic state information for the park. For example, dynamic state information may include a current wait time at a ride, a ride being shut down, and/or other information as well. The super controller may monitor the information in order to optimize the flow in a dynamic fashion such as from time to time. For example, the super controller may re-optimize the flow and reschedule rides and/or ride times through the day as the state information as well as other conditions change. Moreover, the super controller may send update messages as conditions change to provide a revised or updated list of one or more rides and/or corresponding ride times. For example, if a group misses a ride or is too far from its next scheduled ride, the super controller may send an update message wirelessly to the group to reschedule the ride (and/or send other update messages to other groups that might be affected).

In some example embodiments, the super controller 103 may need to resolve conflicts among groups when, assigning PVPs to the same slot of a given virtual queue. When this is the case, the super controller may resolve this conflict. For example, it may give priority in the virtual queue to the PVPs for the group having a higher privilege level. If two groups have the same privilege level, the super controller may use another factor, such as date of ticket purchase.

In some embodiments, the PVPs may have some attributes associated with them. These attributes may give some additional privileges or priorities assigned to them by the park operator. The super controller may consider these attributes in the optimization process. For example, an attribute may be a priority indicator that indicates a certain PVP has priority over another PVP. To illustrate further, an attribute assigned to a PVP can indicate whether the actual group represented by the PVP can be late to their scheduled time and still get on the ride without waiting in line. If so, the late group will be placed in an arrived queue (described further below).

In some example embodiments, there may be only a single virtual queue for each physical ride in the venue. The PVPs and CVPs may be placed in the same virtual queue for a given ride, and the PVP's corresponding attributes (which may be in conjunction with the given ride characteristics, such as throughput) may determine when each PVP is scheduled to reach the front of the line.

Figure 6B:
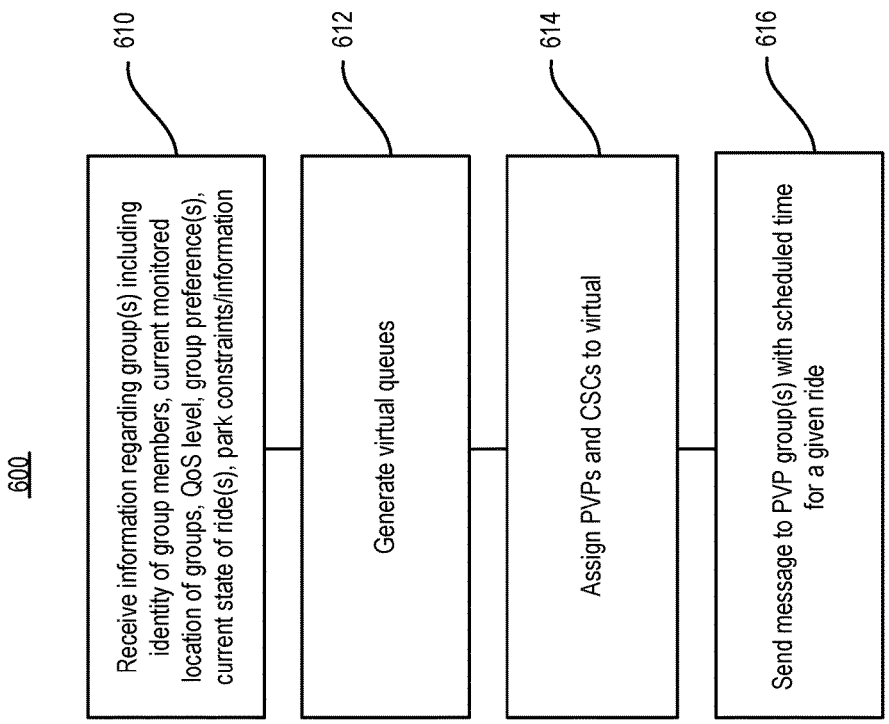
FIG. 6B depicts an example of a process for flow optimization, in accordance with some example embodiments.

FIG. 6B depicts an example process 600 for flow optimization, in accordance with some example embodiments.

At 610, the super controller 103 may receive information in order to perform the flow optimization, in accordance with some example embodiments. The received information may include the identity of the group members (or at least one of the members such as the master controller). In some example embodiments, a master controller may provide the group identity information, when entering the park or when purchasing the tickets for the group. The received information may also include the current monitored location of each of the groups. For example, the groups may be tracked as noted above.

Moreover, the received information may include group preferences for each of the groups. In some example embodiments, a master controller may provide the group preferences when entering the park or when purchasing the tickets for the group. The received information may also include quality of service information for each of the groups. For example, when the tickets are purchased, the super controller may assign a quality of service based on whether the group selects and/or purchases a higher quality of service at the park. The received information may also include park (or ride) state information, and/or other information. The ride state information may be transmitted by one or more rides to show a current queue state or whether the ride is out of service. For example, a ride may have an average rate of 1000 riders per hour, but the current rate at any instant of time may be higher or lower. As such, a processor-based wireless device may for example transmit the current ride state to the super controller.

At 612, the super controller 103 may generate for each actual ride in the park, a virtual queue, in accordance with some example embodiments. The super controller may generate the virtual queues and store those queues in memory, such as dynamic memory. The super controller may then assign, at 614, PVPs and/or CVPs to each of the virtual queues stored in memory.

In some example embodiments, the super controller 103 may configure a threshold limit for the quantity of CVPs and/or PVPs allowed in any given virtual queue. This threshold limit may be a function of a ride's utilization rate for a given day. For example, if it takes A minutes on average to complete a given ride, the ride can accommodate B people, and the total time that the ride is in operation in a given day is T, then the super controller may assign the total number CVPs and PVPs to that tide as a function of is A×B×T.

In some example embodiments, the super controller 103 may distribute throughout the virtual queue the PVPs in batches, so that the PVPs are dispersed among CVPs in the virtual queues. This approach may reduce the likelihood that a plurality of PVP groups are scheduled in the virtual queue without any CVPs, which might lead to an unreasonably long wait times for CVP riders. In some example embodiments, the quantity of PVPs in a given group(s) in the virtual queue may be equal to a maximum group size threshold, which may be defined by for example a venue's operator as a constraint at the super controller.

In some example embodiments, the assignment at 612 may, as noted, take into account the time it takes to go from a given ride to another ride. For example, the super controller may specify as a constraint the set $\{T: t_{Ri,Rj}\}$, wherein the $t_{Ri,Rj}$ parameters define the time to go from ride i to ride j. For a given group (which may indicate to the super controller 103 a given itinerary, for example, of rides and/or times), the super controller may assign the PVPs in the virtual queues to ensure that the desired time slots for the rides adhere to $t_{Ri,Rj}$ of two consecutive ride selections. If the rides are not specified or requested prior to visiting the venue, the super controller may suggests some rides for the group based on their privilege level. Moreover, the super controller may re-optimize dynamically to ensure that the $t_{Ri,Rj}$ constraint is satisfied. For example, the super controller may monitor the current location of each of the groups to ensure that a group's location allows sufficient time (or distance) to reach its next schedule ride. If not, the super controller may reschedule a group since it is likely that the group will miss its scheduled ride.

At 616, the super controller 103 may send a message to notify each of the groups by providing a list of one or more rides and a corresponding schedule for those rides. In this way, groups having a certain quality of service, such as the PVPs, may be scheduled in certain rides to reduce if not eliminate ride times. The message sent at 103 may be an initial list of one or more rides including corresponding times, which may be provided to a master controller for the group as it first enters a park. The message sent at 103 may be sent at other times as well. For example, if the super controller re-optimizes the flow based on received information (for example, current location of a group, the $t_{Ri,Rj}$ constraint, ride state information, and/or the like), the message may comprise an update message with a revised ride and/or schedule. In some example embodiments, the trackers enable the super controller to continuously or nearly continuously monitor the location of each of the groups as they traverse the park. The super controller may update the contents of the virtual queue positions and thus the scheduled start times for the groups. In this way, the super controller may provide wireless update messages to dynamically schedule the groups and thus better control the flow of groups at a given ride or rides.

In some example embodiments, the super controller 103 may re-evaluate the virtual queues, in accordance with some example embodiments. For example, super controller may use an update parameter $T_{update}$. This update parameter may specify a time interval for the super controller to perform another optimization of the virtual queues and repeat for example one or more of 610-616. Alternatively or additionally, a predetermined event, such as the receipt of a message from a master controller or park state change, may trigger the super controller to perform another optimization of the virtual queues and repeat for example one or more of 610-616. Alternatively or additionally, a change in optimization criteria at the master or super controllers may trigger another optimization of the virtual queues and repeat for example one or more of 610-616. For example, a theme park operator may decide to distribute the queues evenly, which may trigger another optimization providing updated ride assignments.

For example, the super controller 103 may receive updated information, such as rides completed by the group(s), rides missed by the group(s), current location for the group(s), change in a group's preference to visit a ride, ride status (for example, maintenance outage and/or the like), and/or actual queue length for a given ride. The super controller may obtain this information and perform one or more of 610-616, which may cause the virtual queues to be revised (for example, the positions of certain PVPs and CVPs may change). Affected groups may then receive update messages with an updated list of one or more rides and/or corresponding times. As noted, the super controller may determine, based the locations for each group, the group's distance from a current location to a location of another ride, such as a ride that the group prefers to ride (for example, a ride on the group's list of rides). This distance may be used to determine the $\{T: t_{Ri,Rj}\}$, and indicate that a group will not make the other ride by the scheduled time. When this is the case, the super controller may reassign, at 614, PVPs and/or CVPs to re-optimize the flow.

In some example embodiments, there is provided a dynamic hierarchical optimization engine with real time feedback that considers both static and dynamic information. The dynamic hierarchical optimization engine may operate in real or near-real time to optimize an objective function configured by, for example, a venue operator, although the objective function may be configured in other ways as well. For example, an outcome of the optimization may be the scheduled ride times for those visitors who have opted into privileged-based system described with respect to FIG. 6A-B.

Figure 7:
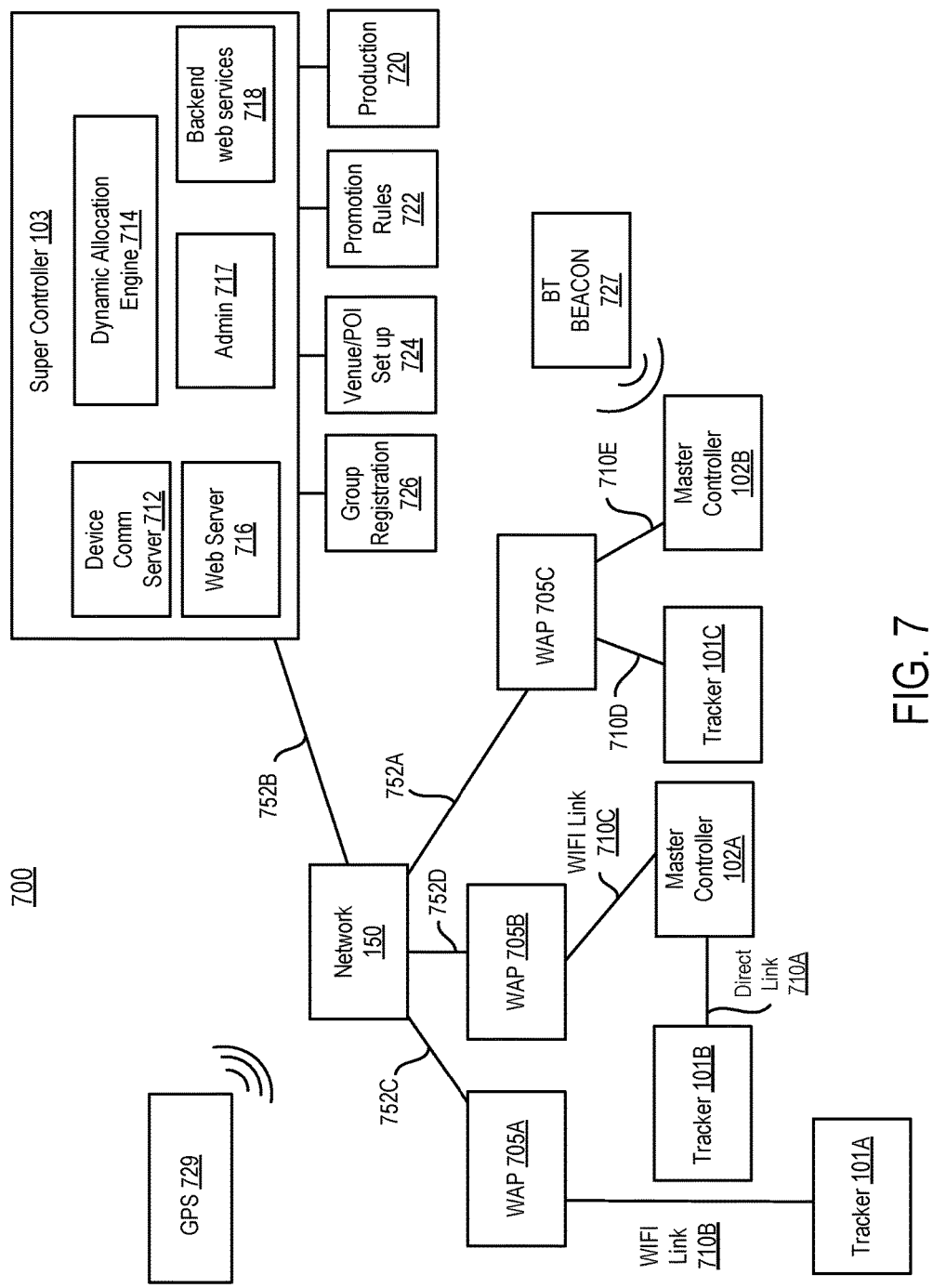
FIG. 7 depicts another example of a system for controlling flow, in accordance with some example embodiments.

FIG. 7 depicts another example system 700, in accordance with some example embodiments.

The system 700 may be implemented to control the flow in a given venue, such as an amusement park, casino, and/or any other type of venue as well.

The system 700 may include trackers 101A-C and master controllers' 102A-B. In the example of FIG. 7, tracker 101B couples via a direct link 710A, such as a Bluetooth link for example, to master controller 102A, which couples to the network 150 via a Wi-Fi link 710C and wireless access point (WAP) 705B. The tracker 101B and master controller 102A form a first group. Tracker 101C and master controller 102B form a second group, but the second group couples to the network 150 via for example Wi-Fi links 710D-E and WAP 705C. Tracker 101A represents a group consisting of one device. In the case of global optimization throughout a theme park, each individual member or group may be provided updated ride schedules dynamically. This may provide reduced wait times, and may substantially reduce wait times (for example, to nearly zero), so that there is very little (or no) real queue for the person or group (so long as the person or group appears at the predefined, scheduled time). This may thus yield a substantially queue-less theme park.

In the example of FIG. 7, the trackers and master controllers may, as noted above, obtain their location via GPS signals sent by GPS satellites 729, although location information may be obtained in other ways including Bluetooth beacons 727 and/or the like.

The system 700 may also include a super controller 103 coupled to the master controllers and trackers via links 752A-D and network 150.

The super controller 103 may include a communications server 712. The communication server may be used to handle messages to and/or from the master controller(s) and/or tracker(s).

The super controller 103 may further include a dynamic allocation engine 714. The dynamic allocation engine may monitor location information for the trackers and/or master controllers, monitor park state information for the venue covered by system 100, receive optimization constraints for optimization, and generate the optimized flow for the groups, such as a schedule that is updated dynamically based on the monitored information and/or constraints. For example, the dynamic allocation engine 714 may perform one or more aspects of process 600. In some example embodiments, the dynamic allocation engine 714 may operate in a hierarchy (as described at FIG. 5, for example) providing information to lower layers, such as the master controller or trackers, and receiving information from lower layers.

The super controller 103 may also include a web server 716 providing an Internet or web interface. The super controller 103 may also include a backend web server 718 interfacing to other servers, such as production server 720 for providing an initial park configuration (for example, defining zones, rides, and/or the like), promotion/quality of service rules server 722 for configuring promotions or coupons to groups, venue and point of interest setup server 724 for configuring constraints and other information about the park (for example, latitude and longitude of rides/zones, capacity of each ride, hours of operations for each ride and/or the like), and group registration 726 for configuring group registrations.

Although system 700 depicts a certain quantity of master controllers, trackers, and super controllers, the system 700 may include other quantities as well.

Moreover, quality of service parameter may be defined, such as regular service, bronze service, silver service, gold service, and/or the like. For example, the quality of service may allow the group to be treated with a certain quality of service. Specifically, the quality of service levels may provide for different quantity of scheduled ride reservations to avoid waiting in line. For example, the super controller may have a virtual queue for each of the rides. The regular quality of service level may provide a single "virtual person" for a single ride, while a higher level quality may provide two "virtual person" to wait in the virtual queues of two rides.

In some example embodiments, the super controller 103 and/or dynamic allocation engine 714 may receive as input the privilege status of the groups, size of the group, desire of the visitors (e.g., their scheduled lunch break), the location of the group members, the attributes associated with the group (e.g., if the group has stayed in a recommended hotel or if the group has an annual membership for the venue, or the amount of money group had spent in the past visits, or alike), the distance between the points of interest, weather conditions, current congestion in the park and the queues for the attractions, optimization criterion, and/or the like.

As noted, the dynamic allocation engine 714 may perform the optimizations disclosed herein in real time, so for example an updated schedule may be generated every time the optimization is updated (or re-executed).

In some example embodiments, optimizing flow and reducing wait times may be provided by using PVPs and CVPs. PVPs and CVPs may represent park visitors in a virtual park including virtual queues, and the virtual park and virtual queues represent a real park and real queues in the park. CVPs may represent general public visitors who have not opted into (or purchased) a higher quality of service. The PVPs may represent visitors who have purchased (or opted into) a higher quality of service providing for example reduced wait times. The higher quality of service provided to the PVPs may include one or more attributes that define the status of the PVP while in a virtual queue of a given ride, for example. To illustrate by way of example, in a given virtual queue, a PVP (which is assigned to a rider or group that has purchased a platinum ticket) may be placed before another PVP (which is assigned to a rider or group that has purchase a lower, gold ticket). In this example, the rider who is virtually represented by a PVP with platinum attribute will get a scheduled time that is earlier than the guest who is virtually represented by PVP with gold attribute. These attributes may be taken into account by the super controller at 614 (FIG. 6B).

To illustrate with another example, a PVP representing an out-of-area guest who is staying at a certain affiliated hotel (for example, a hotel affiliated with the venue) may have an attribute value that gives them priority in the virtual queue over PVPs for out-of-area guests staying in non-affiliated hotels (for example, a hotel not affiliated with the venue).

The system at FIGS. 6A and 7 may allow a group having privileges (for example, due to purchasing a higher quality of service) to place a PVP in one or more virtual queues as noted above. This privileged group may be allocated a fixed quantity of PVPs at the back of multiple virtual queues, each of which is also continually seeded with CVPs representing public groups. The seeding of public groups may be determined by flow capacity, and this seeding may be tuned by capacity variables (e.g., a time slice and/or a group size). This seeding may also be adjusted by the cancellation or addition of any public group. This allows for Resource Outage contingencies. The sharing of a singular queue with both private and public groups may preserve the notion of fairness in allocating access to the resource.

When a group's PVP(s) reaches the front of a virtual queue, the group may be sent a message, such as message 605. More importantly, the group should be physically present at the real ride to claim their position in the real queue for that ride.

A privileged groups may have more than one PVP that has reached the first position (also referred to as the front) of a virtual queue. However, the privileged group may not be ready to claim that position. The virtual queuing may be a first in first out approach. As such, to be granted access to the resource (which is the position in the real queue), the privileged group may be scheduled, or required, to arrive and claim their PVP's position in the actual line. If they are not present to claim the PVP's position in the actual line when the PVP reaches the front of the virtual queue, the PVP may be moved into another queue, such as arrived queue. When this is the case, the PVP may remain in this other arrived queue until the privileged groups arrives at the real queue and ride to claim their position in the queue. In some instances, the PVP may remain in the other arrived queue for a pre-determined time or until cleared (for example, at the end of the day when all of the virtual queues or arrived queues may be cleared). In this arrived queue embodiment, when the PVP misses a scheduled ride time, the super controller will not reschedule the PVP for that ride since the PVP is placed in the arrived queue and handled via that queue.

In some example embodiments, the arrived queue may be handled by the super controller 103 (FIG. 6A) or dynamic allocation engine 714 (FIG. 7). A group may claim its PVP(s) in the arrived queue, when the group arrives at the physical queue of the real ride. The group may claim from the arrived queue in a last in first out manner. The super controller 103 may, however, switch from a first in first out queue handling to a last in last out queue handling for the arrived queue. When the last in last out approach is used, groups that arrive on time are guaranteed immediate access to the resource. And, if multiple groups are simultaneous late arrivals then access may granted in the order of least amount of time their PVP has been in the arrived queue (e.g., priority may be given to reward a privileged group's timeliness.)

In some example embodiments, the super controller 103 (see, for example, FIG. 6A) may include an arrived queue for each ride. This arrived queue represents a virtual queue for groups (and their corresponding PVPs) that were not present at the real ride when the privileged group's PVP was scheduled to be at the front of the virtual queue. Like other virtual queues, the super controller may manage the arrived queue and send to the groups update messages 605 indicating when a group's PVP is expected to be at the front of the arrived queue and thus when the group should be at the corresponding real ride. This estimated time may be determined based on the position in the arrived queue, the quantity of PVPs in the arrived queue, and/or the like.

In some implementations, a public group (which may represent a group not having obtained or purchased a privileged quality of service) may be assigned only one CVP in each virtual queue of a venue. Moreover, the super controller may not allow the CVP to be placed in a later arrival queue, as in the PVP case noted above.

In some example embodiments, process 600 may disseminate via message(s) 605 a new or update schedule to the tracker, master controllers and the like from time to time (for example, each time process is executed or re-executed). The optimization of process 600 can be impacted by the quantity of groups missing their scheduled time and thus being placed in the arrived queue. For example, a large arrival queue can impact the quantity of changes as a result of rescheduled time slots for the subsequent schedules. In order to minimize changes to already established time slots, a park operator may provide certain incentives to the privileged guest groups that show up on-time, i.e., at their scheduled time. This can be in form of points that accumulate and at a certain threshold, become a PVP attribute entitling the PVP to priority privilege, or even a promotional offer to the actual guest.

In some example embodiments, a theme park operator may gather information about guests, such as number and size of the groups visiting, their date/time of arrival, and preferred rides, in advance. This may be accomplished by incentivizing the visitors to register in advance through web server 716 for example, and purchasing higher quality of service tickets that provide for example PVPs for the group. Combining this information with other available data, such as historical attendance, ride availability, scheduled shows or parades, weather, and/or the like, the super controller 103 may determine (as part of pre-opening preparation or before guest arrival, for example) a preliminary ride schedule for the privileged guests. Moreover, the scheduling may be updated from time to time throughout the day using for example process 600. In addition, this updating may take into new or updated information being received at the super controller 103 with the objective of minimizing the aggregate wait time for visitors including PVPs and CVPs. For example, just prior to the park opening and after a privileged group has checked in via web server 716, a park operator may start performing optimizations via process 600.

Figure 8:
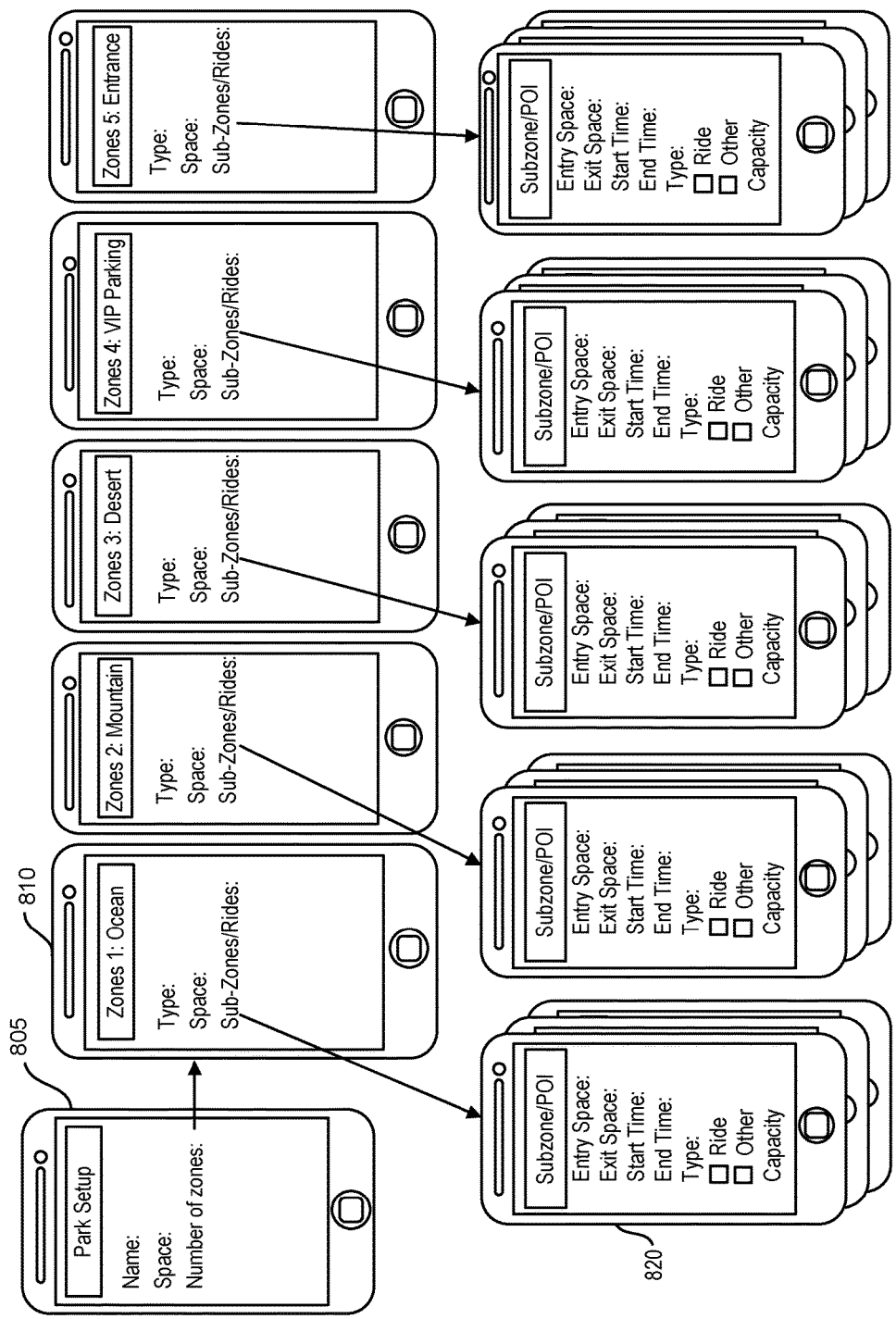
FIGS. 8-15 depict examples of user interface views that may be presented, in accordance with some example embodiments.

In the FIG. 8 example, a venue setup view 805 may be generated, and this view may enable selection, or identification of, the name of the venue ("Name"), enable defining a geo-fence defining the venue's boundary ("Geofence"), and enable selection, or identification, of a quantity of zones in the venue ("Number of Zones"). In this example, 8 zones have been identified, such as zones 1-8. For each zone, there may be one or more subzones, such as subareas or rides, within the subzone. For example, the ocean zone 810 may be defined by specifying a type (for example, ride, show, restaurant, retail establishment, and/or the like), a geo-fence, and one or more subzones. When the sub-zones/rides are selected, user interface view 820 may be presented. At user interface view 820, a geographic entry location for the subzone can be defined, a geographic exit location for the subzone can be defined, a start (or opening) time for the subzone can be defined, a stop (or closing) time for the subzone can be defined, a ride type (for example, a ride, a show, a food venue, and the like) for the subzone can be defined, and a capacity per hour for the ride can be defined.

Figure 9:
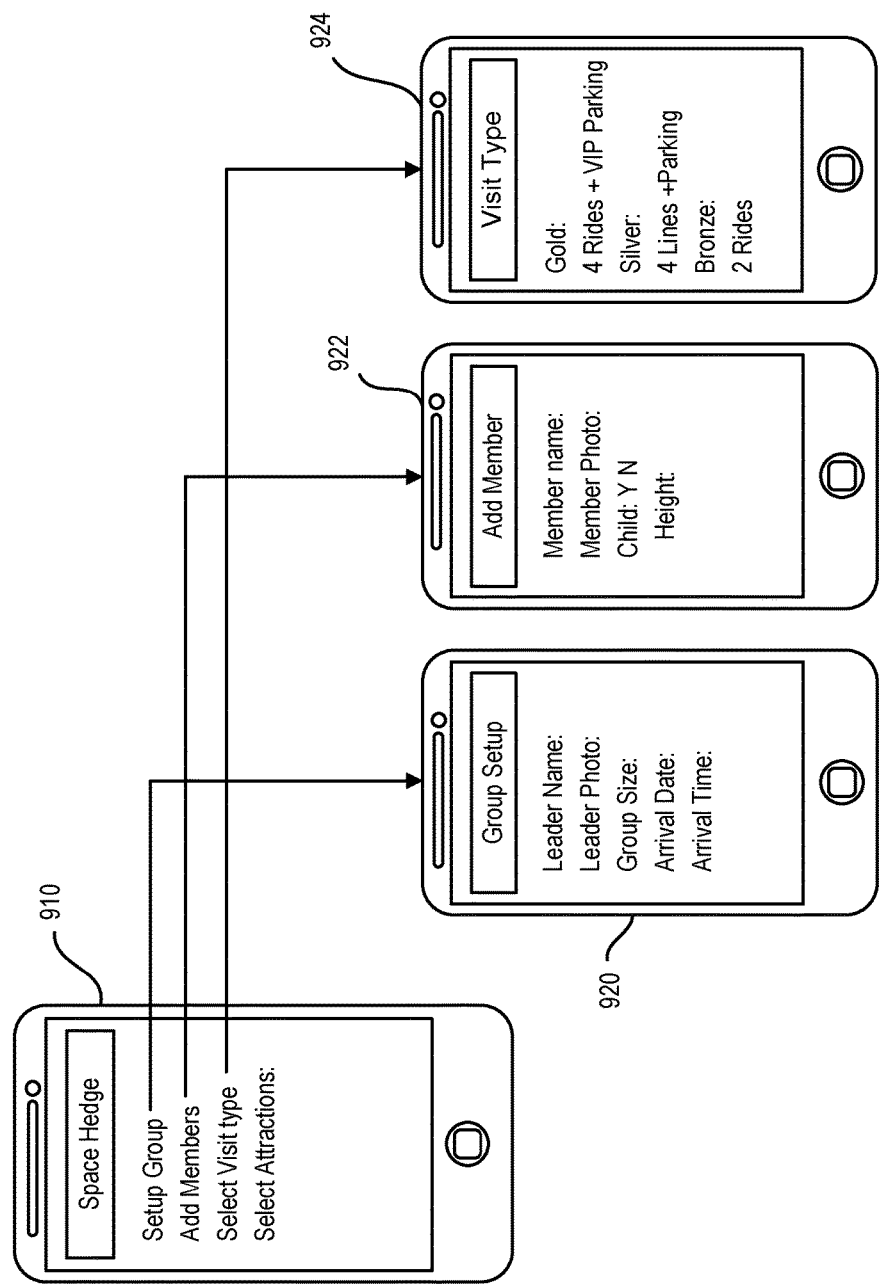

FIG. 9 depicts examples of user interface views associated with setting up a group during a purchase phase. The user interface views of FIG. 9 may be presented at a master controller and/or a group registration computer 726 at the super controller.

During the purchase of tickets for example, a group set up phase may allow a group to be configured. In the example of FIG. 9, user interface view 910 may be presented to allow setting up a group by adding members, selecting a visit type, and selecting attractions at the venue.

When setup group is selected at 910, the user interface view 920 may be generated and presented. User interface view 920 enables selection or identification of a group leader, a leader photo, a group size, an arrival date, and an arrival time.

When add member is selected at 910, the user interface view 922 may be generated and presented. User interface view 922 enables selection or identification of each member of a group, a member photo, an indicator of age (for example, child, adult, senior, and the like), and other information, such as child's height, special needs, such as handicapped access.

When visit type is selected at 910, the user interface view 924 may be generated and presented. User interface view 924 enables selection of reservation quality of service type, such as gold, silver, bronze, and/or the like.

Figure 10:
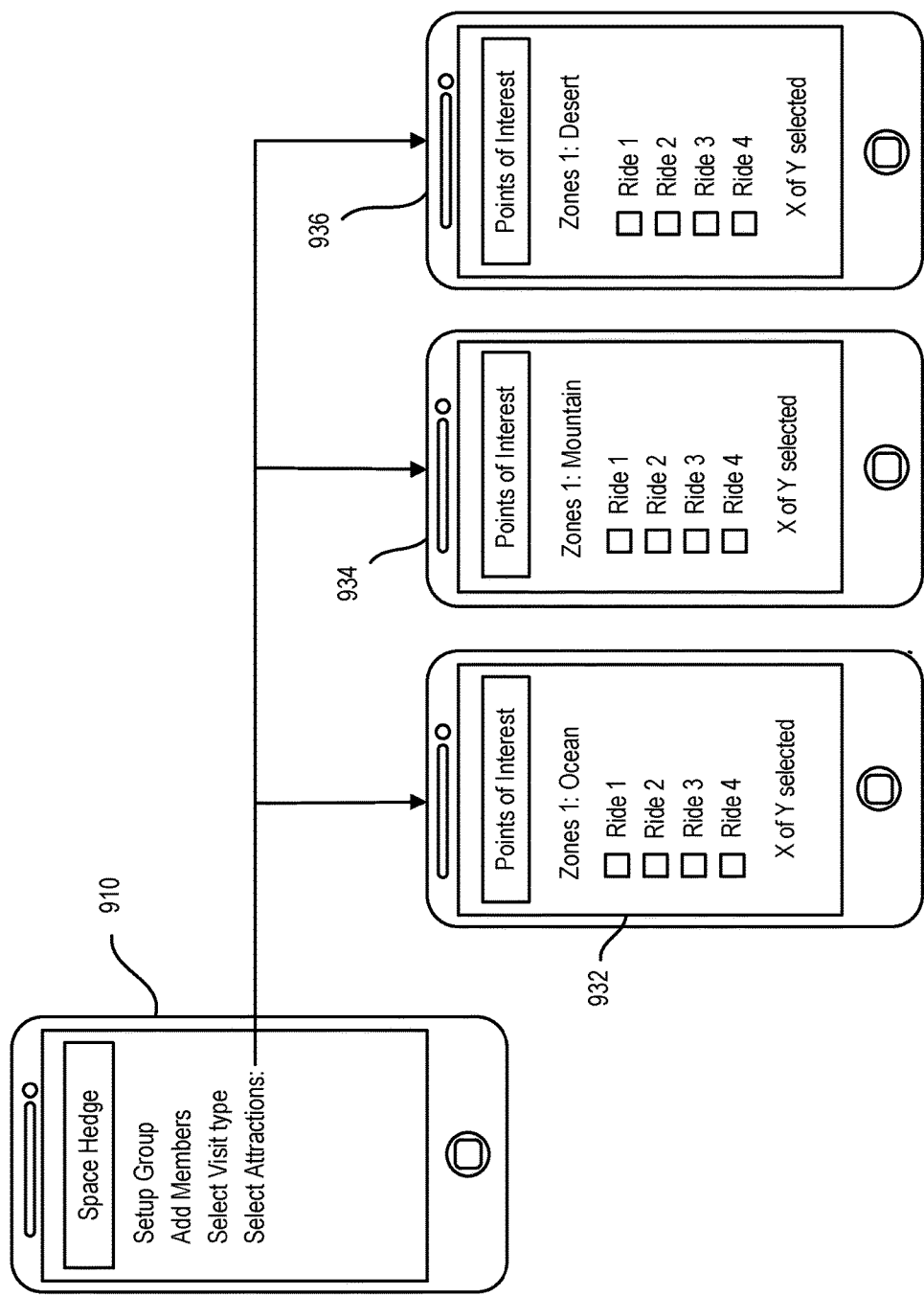

When select attractions is selected at 910, user interface views 932-936 may be presented for each zone in the venue, as shown in FIG. 10. For example, for each zone such as ocean 932, one or more rides may be selected. In this way, the group may select the rides in each zone that they want to ride on.

Figure 11:
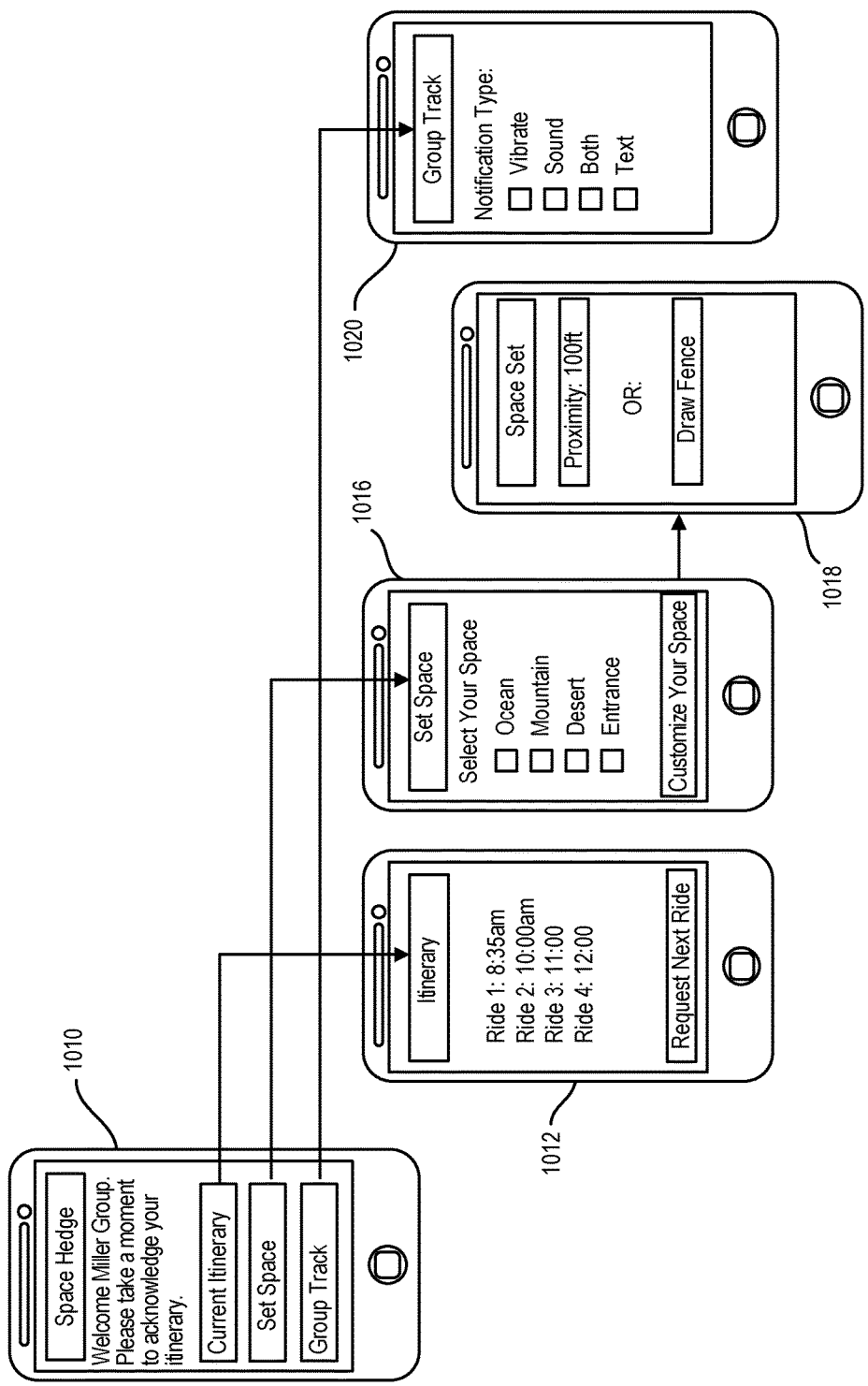

FIG. 11 depicts examples of user interface views 1010-1020 that may be presented to a master controller when the master controller arrives at the venue. In this example, the group leader (which may be carrying a master controller) may check in and activate trackers for the group members. For example, the trackers used by the group members may comprise dedicated trackers, such as the FIG. 2B device. The trackers (and/or master controller) may be provided to the group members during arrival. The master controller may be a dedicated device as well, although the master device may be a smart phone or tablet that downloads a so-called "venue application" (which may be downloaded from the super controller or provided by another server or in other ways as well). The venue application may provide the flow optimization aspects at the tracker and/or master controller. In either case, when the master controller arrives at the venue and accesses the super controller as part of activation, the super controller may trigger user interface view 1010 to be presented at the master controller. User interface view 1010 may be used to view a current itinerary representative of an optimized flow through the venue. This optimized flow may take into account the desired rides of the group, the flow optimization criteria, and other factors. The user interface view 1010 may enable a selection of a zone or space and group tracking.

When current itinerary is selected at user interface view 1010, user interface view 1012 may be presented to show the current flow, such as the list of rides and a schedule. An additional ride maybe selected by selecting "Request Next Ride," which triggers a user interface view 1210 (FIG. 12) to be presented where additional rides may be selected.

When set space is selected at user interface view 1010, user interface view "Set Space" is presented. User interface view 1010 enables the group leader to customize one or more selected zones or spaces. For example, one of the zones, such as ocean, can be selected along with customize your space icon at user interface view 1016. When that is the case, a proximity distance or fence may at 1018 be selected and/or drawn around the selected zone. In this example, if a tracker is 100 feet outside a zone, then the master controller may receive from the super controller an alert, which can be defined at user interface view 1020 (vibrate, sound, text, or combination thereof).

Figure 12:
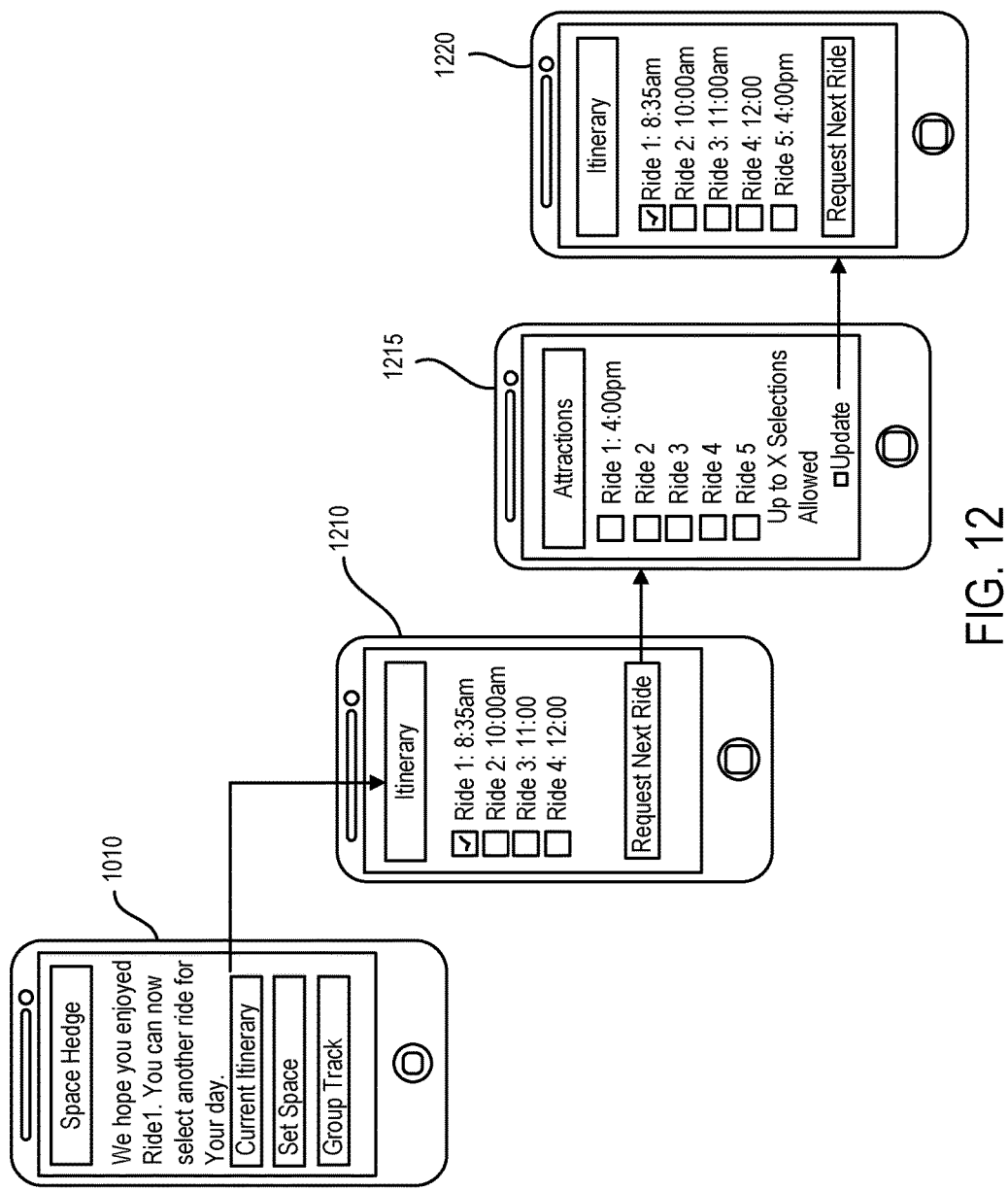

FIG. 12 depicts an example of a user interface view 1210 presented at the master controller after the group has completed a ride. In the example of FIG. 12, after the group completes the first ride at 8:35 (as shown by user interface view 1210 where an "X" is shown), the super controller may send an update to the master controller allowing the selection of another ride. In this example, the group's quality of service limits ride selection to 5 queued rides, so after completion of the ride 1, the super controller requests the master controller to select another ride at 1215. At user interface view, the super controller may indicate available times for the candidate rides (for example, 4 PM). Moreover, the super controller may, based on the selection at 1215 and flow optimization, update the itinerary as shown by user interface view 1220.

Figure 13:
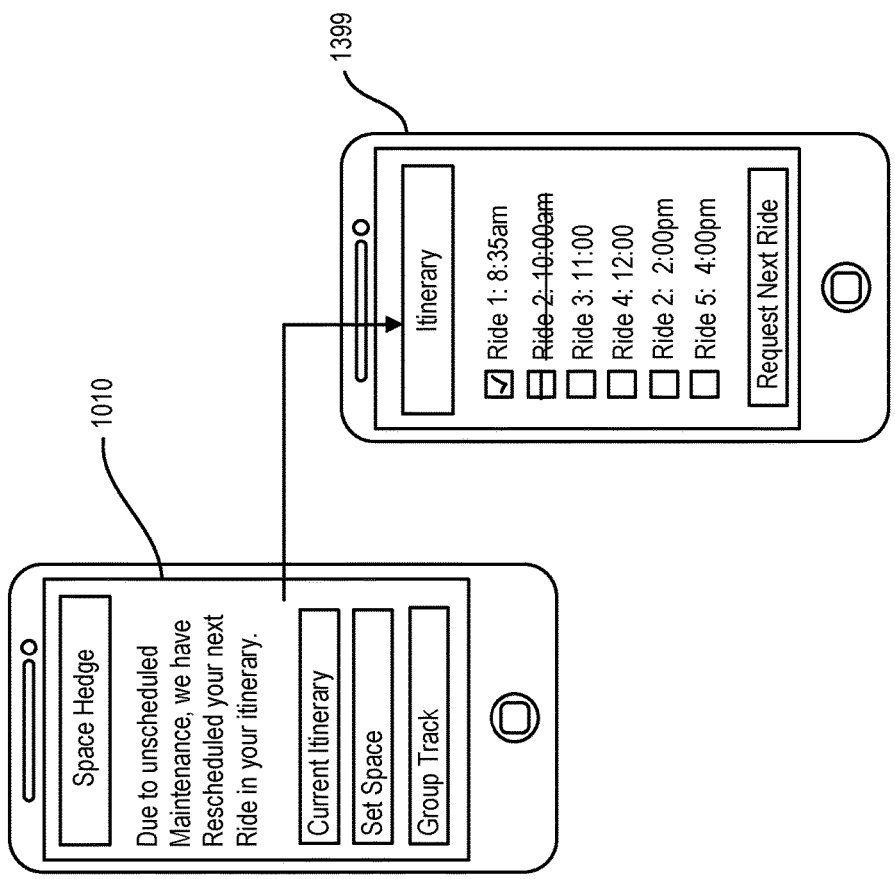

If a cancelation occurs (for example, due to a temporarily closed ride), the user interface view 1012 may show the cancelation. FIG. 13 depicts an example user interface view 1399 depicting a strikethrough of ride 2. The cancelation may also trigger super controller to send to the master controller of the group affected by the cancelation with additional promotions, revised itinerary, and the like.

In some example embodiments, the super controller may send promotional offers to the master controller. These offers may be sent based on a variety of factors. For example, the super controller may decide what promotions to offer to a group based on: available inventory, for example, a group not showing up for a ride, restaurant open table tops, and/or the like; proximity of the group to a given attraction (ride, restaurant, retail location) and a group's next scheduled reservation (for example, if group will or will not be able to make the next scheduled reservation); offers based on group's historical activities (which may be represented by a PVP attribute); offers to optimize overall venue flow; offers to optimize overall wait times (for example, offer a 10% discount to a restaurant if the group goes to lunch before or after the peak volume for lunch time), and/or the like.

To illustrate, a group may be headed to the second ride on the itinerary but the ride breaks down. In this example, the super controller estimates a 30-minute ride shut down. To enhance flow, the super controller may send to the group a message including an offer for a nearby restaurant and reschedule the temporarily unavailable ride.

Figure 14:
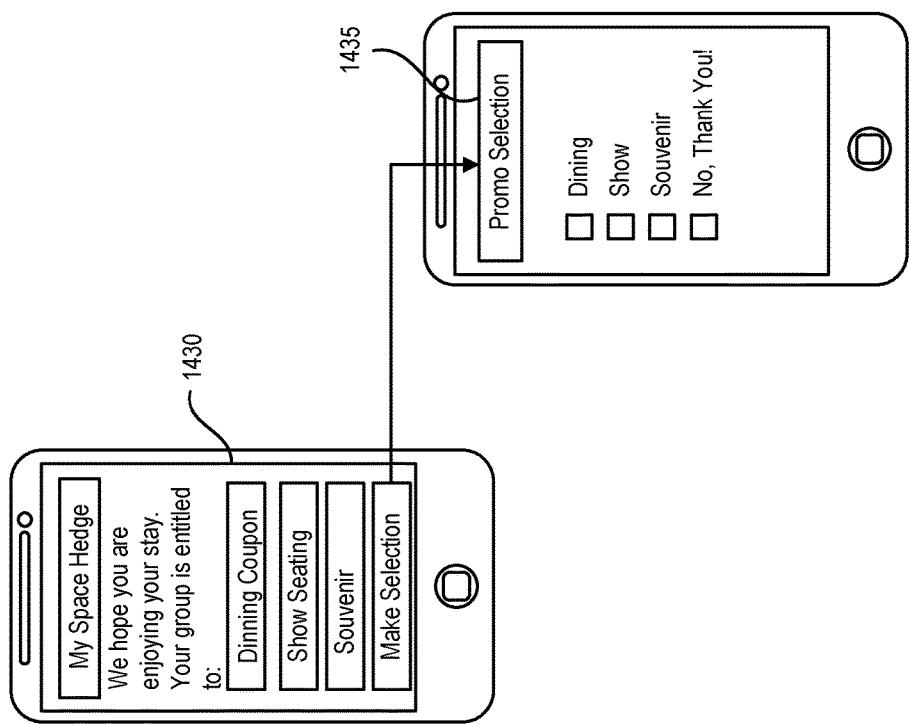

FIG. 14 depicts an example of a user interface view 1430 that can be sent to a master controller dynamically. The user interface view 1430 may allow selection of a restaurant coupon, show seat selection for a show for example, find a no-wait ride selection, and/or the like. In the example, the master control may view the specific offers at 1435.

Figure 15:
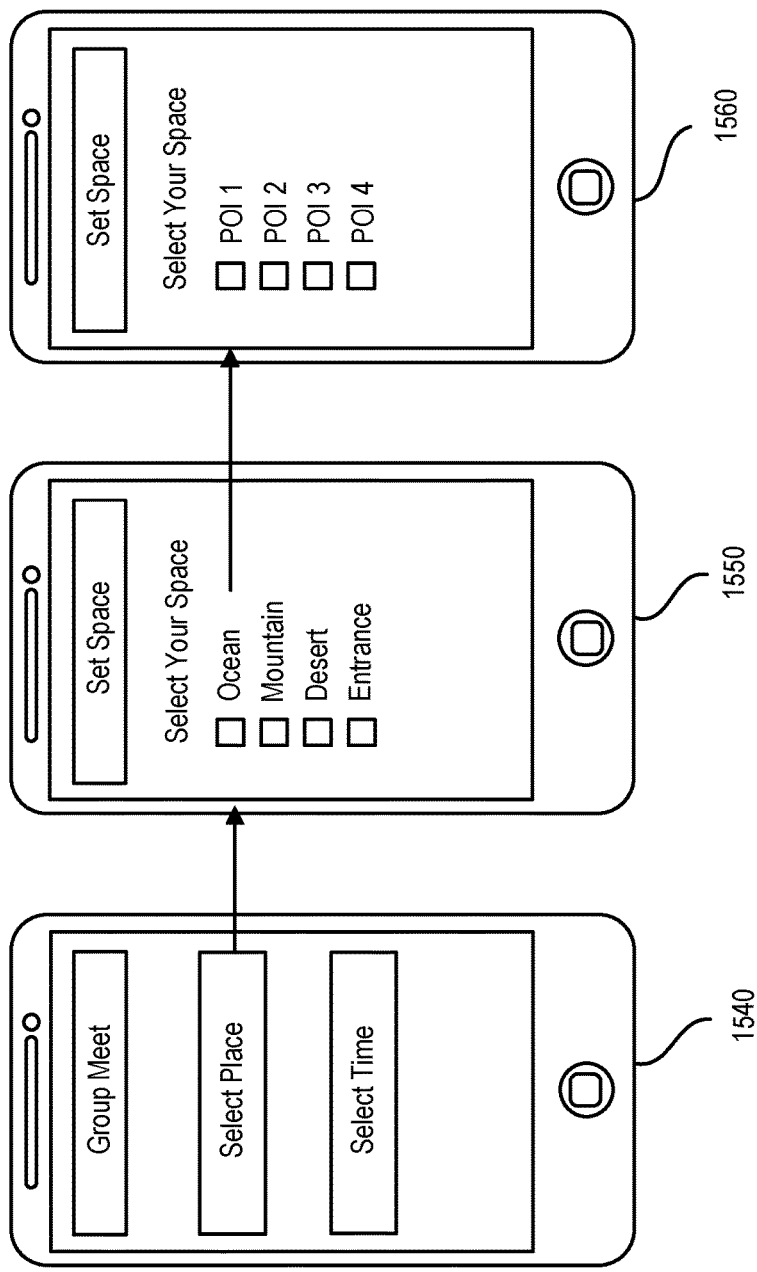

FIG. 15 depicts an example of a user interface view 1540 for setting up a group meeting. In this example, the master controller selects the time and place of a meeting at user interface view 1540. When select place is selected at 1540, the general zone may be selected at user interface view 1550, while the location in the zone may be selected at user interface view 1560. When select time is selected at 1540, the master control may indicate a time as well. The time and place may then be sent to the trackers in the group by sending a message.

In some example embodiments, a group may be formed based on certain information obtained by the system. Referring to FIG. 6A for example, groups may be formed dynamically based on information obtained or determined by the super controller 103. To illustrate further, one or more PVP may be formed based on information provided by a leader (for example, at a master controller or tracker) registering the group. Alternatively or additionally, one or more dynamic PVPs may be formed based on other types of information, such as social media obtained information, traffic reports, weather, news events, the outcome of sporting events, and/or other information determined by the system including the super controller. This dynamic group may form its own independent group or be an overlay group.

For example, the super controller may determine (for example, from registration data, social media, news feeds, and/or the like) that there are visitors from New York City and the Yankees have just won the World Series. In this example, the system may form a dynamic group of Yankee fans. This group may be routed as a dynamic PVP and diverted to locations which may be of interest to Yankee fans, such as a retail location selling Yankee memorabilia, a Yankee player autograph line, and/or the like. In this example, the dynamic PVP group may be a dedicated group and handled and routed as described above with respect to FIG. 6A, for example. Alternatively or additionally, a person (or tracker) may a member of the dynamic PVP Yankee group, and also be part of another, base PVP group. When this is the case, the dynamic PVP Yankee group serves an overlay, so the member (or tracker) may be a part of more than one PVP.

In some example embodiments, the system including the super controller may send messages to all trackers that match an attribute. Returning to the Yankee example, the system including the super controller may send an invite message to all trackers identified as being associated with a Yankee fan (for example, as determined from social media) and/or being associated with someone born in New York City (for example, as determined from registration data, social media, and/or other data sources) to join the Yankee group. If a tracker responds with an acceptance, the tracker may then be associated with a dynamic PVP group for Yankee fans and handled as a PVP that is routed and/or scheduled in virtual queues as described above.

Although the previous example refers to a dynamic PVP group of Yankee fans, other attributes may be used to form the dynamic group. For example, the system including the super controller may determine (from social media, registration data, databases of historical data, and/or the like) that one or more trackers are associated with users have not visited a certain attraction or location, such as a new ride. This unvisited attraction attribute may be used by the system including the super controller to send an invite message to all trackers that match the attribute. If a tracker responds with an acceptance, the tracker may then be associated with a dynamic PVP group of users that have not visited the new ride. This dynamic PVP group may then be handled as a PVP that is routed and/or scheduled in virtual queues as described above. In some example embodiments, the invite message may include an incentive, such as a coupon or discount, to encourage the members of the PVP group to visit the new ride.

To illustrate with an example, the system including the super controller may determine that there are significant number of visitors who have purchased their tickets on-line and that the geographic area associated with these tickets is for example, the San Francisco Bay Area. The "on-line purchase" and "from San Francisco Bay Area" attributes may be stored by the system and used to form a dynamic PVP group.

To illustrate with another example, the system including the super controller may determine that there are more than expected quantity of girls between the ages 5-9 in attendance. The system may, based on an indication from a database of warehouse inventory, determine that there is an excess inventory of "princess" dresses in the warehouse. In this example, the system including the super controller may define an attribute as "princess enthusiast." The super controller may then send an invite messages to trackers (and the master controller for the tracker) having a user matching this princess enthusiast attribute (for example, all girls age 5-9). The invite message may indicate that there is a "sale" of princess dresses. The message may pop up or be presented to the tracker when the tracker is in the vicinity of the location selling the princess dresses. Alternatively or additionally, a dynamic PVP group of princess enthusiast may be created, and the dynamic PVP group may be routed to flow past the warehouse.

An attribute may be formed based on on-site sensors. For example, a camera may identify that a tour bus includes users with red shirts. The system may form one or more dynamic PVP groups from based on the users wearing a red shirt.

In some implementations consistent with the subject matter disclosed herein, the dynamic hierarchical nature of the disclosed subject matter may provide, via the group-based approach, may provide improved optimization for a customer and a venue. Moreover, controlling the quantity of users in each group may also provide improved optimization.

Various implementations of the subject matter described herein may be realized in digital electronic circuitry, integrated circuitry, specially designed ASICs (application specific integrated circuits), computer hardware, firmware, software, and/or combinations thereof. The circuitry may be affixed to a printed circuit board (PCB), or the like, and may take a variety of forms, as noted. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications, or code) include machine instructions for a programmable processor, and may be implemented in a high-level procedural and/or object-oriented programming language, and/or in assembly/machine language. As used herein, the term "machine-readable medium" refers to any non-transitory computer program product, apparatus and/or device (e.g., magnetic discs, optical disks, memory, Programmable Logic Devices (PLDs)) used to provide machine instructions and/or data to a programmable processor, including a machine-readable medium that receives machine instructions.

To provide for interaction with a user, the subject matter described herein may be implemented on a computer having a display device (e.g., a CRT (cathode ray tube) or LCD (liquid crystal display) monitor) for displaying information to the user and a keyboard and a pointing device (e.g., a mouse or a trackball) by which the user may provide input to the computer. Other kinds of devices may be used to provide for interaction with a user as well; for example, feedback provided to the user may be any form of sensory feedback (e.g., visual feedback, audible feedback, or tactile feedback); and input from the user may be received in any form, including acoustic, speech, or tactile input.

The subject matter described herein may be implemented in a computing system that includes a back-end component (e.g., as a data server), or that includes a middleware component (e.g., an application server), or that includes a front-end component (e.g., a client computer having a graphical user interface or a Web browser through which a user may interact with an implementation of the subject matter described herein), or any combination of such back-end, middleware, or front-end components. The components of the system may be interconnected by any form or medium of digital data communication (e.g., a communication network). Examples of communication networks include a local area network ("LAN"), a wide area network ("WAN"), and the Internet.

Although a few variations have been described in detail above, other modifications are possible. For example, while the descriptions of specific implementations of the current subject matter discuss analytic applications, the current subject matter is applicable to other types of software and data services access as well. Moreover, although the above description refers to specific products, other products may be used as well. In addition, the logic flows depicted in the accompanying figures and described herein do not require the particular order shown, or sequential order, to achieve desirable results. Other implementations may be within the scope of the following claims.

What is claimed is:

1. A method comprising:
   receiving, at a first controller, a location of a first group of trackers, the first group of trackers coupled wirelessly with a second controller;
   defining, by the first controller, a geographic space around the second controller based on a distance between the second controller and each of the first group of trackers;
   detecting, by the first controller, that at least one tracker of the first group of trackers has left the geographic space; and
   sending, by the first controller and in response to the detecting, an alarm message to the second controller and/or the at least one tracker, the alarm message indicating that the at least one tracker has left the geographic space;
   determining, by the first controller and based on each the first group trackers being within the geographic space, a first schedule for the first group of trackers, the first schedule determined based on the location of the first group of trackers relative to an attraction of a venue, and based on a virtual queue for the attraction, the virtual queue representing a real queue for the attraction and including a preferred virtual person and at least one commodity virtual persons, the preferred virtual person providing, for the first group of trackers, a position in the virtual queue and the at least one commodity virtual persons having a lower quality of service when compared to the preferred virtual person, the position associated with a first time when the preferred virtual person will reach front of the virtual queue; and
   receiving, by the first controller, a group state indicative of an updated location of the first group of trackers and/or an attraction state indicative of a state of the real queue;
   determining, by the first controller and in response to the received group state and/or the received attraction state, a second time when the preferred virtual person will reach the front of the virtual queue, the second time occurring after the first time and indicating that the preferred virtual person will not arrive at the attraction at or before the first time;
   determining, by the first controller and based on the second time, a quantity of the at least one commodity virtual persons to insert before the preferred virtual person so that the preferred virtual person will arrive at the attraction at or before the second time;
   updating, by the first controller and in response to the determined quantity, the first schedule to form a second schedule for the first group of trackers, the updating including an adjustment to the position of the preferred virtual person in the virtual queue by at least inserting, before the preferred virtual person, the determined quantity of the at least one commodity virtual persons into the virtual queue, the adjusted position associated with the second time so that the preferred virtual person will reach the front of the virtual queue at or before the second time, the adjusted position also associated with a time in the real queue for the first group of trackers to attend the attraction;
   sending, by the first controller, a message indicating the second schedule to the second controller and/or the first group of trackers.

2. The method of claim 1, wherein the commodity virtual person corresponds to a real persons in the real queue for the attraction, and wherein the preferred virtual person corresponds to the first group in route to the attraction.

3. The method of claim 1, further comprising receiving, by the first controller, one or more of a distance to a subsequent attraction, a likelihood that the first group may miss the subsequent attraction, an average speed for the first group, and/or an indication that the attraction has been missed by the first group.

4. The method of claim 1, further comprising receiving, by the first controller, a quality of service level for the first group.

5. The method of claim 1, further comprising receiving, by the first controller, a preference regarding one or more attractions the first group prefers to visit at the attraction.

6. The method of claim 1, further comprising receiving, by the first controller, one or more constraints regarding the attraction.

7. The method of claim 1, wherein the updating comprises continuously monitoring the location of the first group as the first group traverses the venue including the attraction.

8. The method of claim 1, wherein the message indicating the second schedule indicates a second time associated with a second attraction.

9. The method of claim 1, wherein the determining further comprises optimizing for a plurality of groups, wherein a second group of the plurality of groups has a corresponding second preferred virtual person holding a position in the virtual queue.

10. The method of claim 9, wherein the optimizing is performed for the second group based on received information associated with the second group, the received information comprising a location of the second group.

11. The method of claim 10, wherein at least one of the groups is dynamically formed based on an attribute.

12. The method of claim 1, wherein the message comprises an estimated time the preferred virtual person is expected to be at front of the virtual queue, the estimated time further indicative of the estimated time the first group is expected to be at front of the real queue.

13. The method of claim 1, wherein the updating further comprises adjusting a second position of the preferred virtual person in a second virtual queue of a second attraction by at least inserting, before the preferred virtual person, one or more additional commodity virtual persons into the second virtual queue, the adjusted second position representing a time in a real queue for the first group of trackers to attend the second attraction.

14. The method of claim 1 further comprising:
monitoring, by the first controller, one or more conditions in the venue including the attraction being traversed by the first group.

15. The method of claim 1, wherein the first controller comprises a super controller in a first layer of a hierarchical network, the super controller coupled wirelessly to the second controller, wherein the second controller comprises a master controller in a second layer of the hierarchical network, the second layer below the first layer, wherein the first group of trackers is in a third layer of the hierarchical network, the third layer below the second layer.

16. The method of claim 1, wherein the trackers each comprise a smart watch and/or a wearable wireless device.

17. The method of claim 1, wherein the venue comprises an amusement park including a plurality of attractions.

18. The method of claim 1, wherein the venue comprises a cruise ship, a museum, a shopping mall, a school, a casino, a resort, a campus, and/or a retirement care facility.

* * * * *